United States Patent
Yamaguchi et al.

(10) Patent No.: US 11,074,178 B2
(45) Date of Patent: Jul. 27, 2021

(54) MEMORY SYSTEM AND METHOD OF CONTROLLING NONVOLATILE MEMORY

(71) Applicant: Kioxia Corporation, Minato-ku (JP)

(72) Inventors: Kensaku Yamaguchi, Kawasaki (JP); Shinichi Kanno, Ota (JP)

(73) Assignee: Kioxia Corporation, Minato-ku (JP)

( * ) Notice: Subject to any disclaimer, the term of this patent is extended or adjusted under 35 U.S.C. 154(b) by 0 days.

(21) Appl. No.: 16/805,946

(22) Filed: Mar. 2, 2020

(65) Prior Publication Data

US 2021/0081327 A1 Mar. 18, 2021

(30) Foreign Application Priority Data

Sep. 13, 2019 (JP) .............................. JP2019-167659

(51) Int. Cl.
*G06F 12/02* (2006.01)
*G06F 12/1009* (2016.01)

(52) U.S. Cl.
CPC ...... *G06F 12/0253* (2013.01); *G06F 12/0276* (2013.01); *G06F 12/1009* (2013.01); *G06F 2212/657* (2013.01); *G06F 2212/7205* (2013.01)

(58) Field of Classification Search
CPC ............. G06F 12/0253; G06F 12/0276; G06F 2212/7205; G06F 2212/657; G06F 12/1009

See application file for complete search history.

(56) References Cited

U.S. PATENT DOCUMENTS

| | | | |
|---|---|---|---|
| 2017/0132125 A1* | 5/2017 | Cai | .......................... G06F 11/10 |
| 2017/0168929 A1 | 6/2017 | Kanno | |
| 2018/0165188 A1 | 6/2018 | Huang et al. | |
| 2018/0373440 A1* | 12/2018 | Shah | ...................... G06F 3/0611 |
| 2019/0050345 A1* | 2/2019 | Satoyama | ............... G06F 12/00 |
| 2019/0114272 A1 | 4/2019 | Dubey et al. | |

FOREIGN PATENT DOCUMENTS

JP 2017-111476 A 6/2017

* cited by examiner

*Primary Examiner* — Sean D Rossiter
(74) *Attorney, Agent, or Firm* — Oblon, McClelland, Maier & Neustadt, L.L.P.

(57) ABSTRACT

According to one embodiment, a memory system includes a nonvolatile memory and a controller. The controller receives a movement request from a host, the movement request designating a logical address of movement target data. When update data corresponding to the designated logical address is not written to the nonvolatile memory by a write request from the host in a period from the reception of the movement request to start of movement of data corresponding to the designated logical address, the controller executes a movement process of moving data corresponding to the designated logical address to a movement destination block in the nonvolatile memory. When the update data is written to the nonvolatile memory in the period, the controller does not execute the movement process.

14 Claims, 17 Drawing Sheets

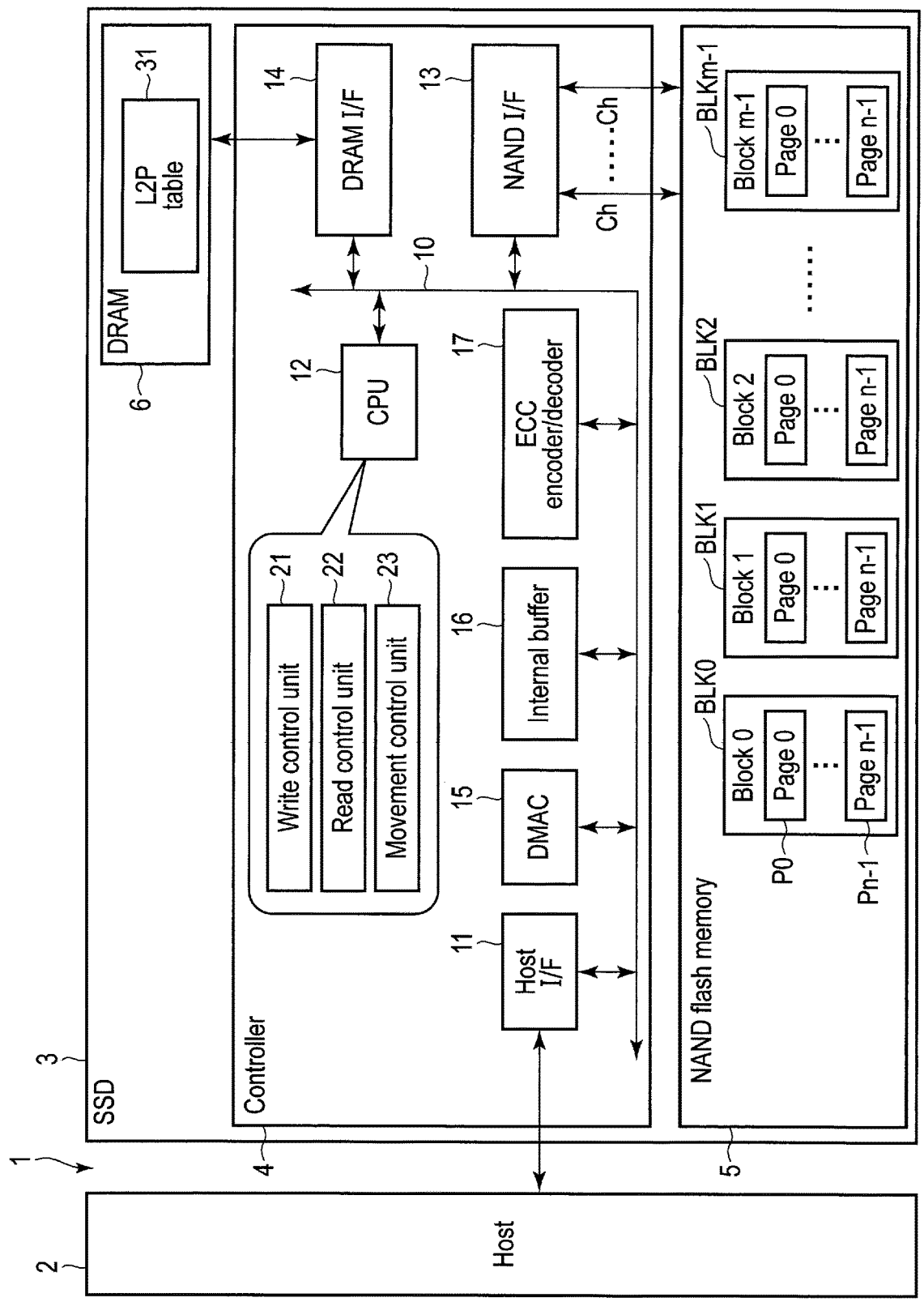
F I G. 1

| Movement request | Description |
|---|---|
| Command code | Command code of movement request |
| LBA list | List of logical addresses each corresponding to movement target data |
| Identifier of movement destination block (Movement destination block ID) | Identifier of block to which movement target data is to be moved |

F I G. 2

| Movement request | Description |
|---|---|
| Command code | Command code of movement request |
| LBA list | List of logical addresses each corresponding to movement target data |
| Identifier of stream (Stream ID) | Write destination block allocated to stream designated by this identifier is determined as movement destination block |

F I G. 3

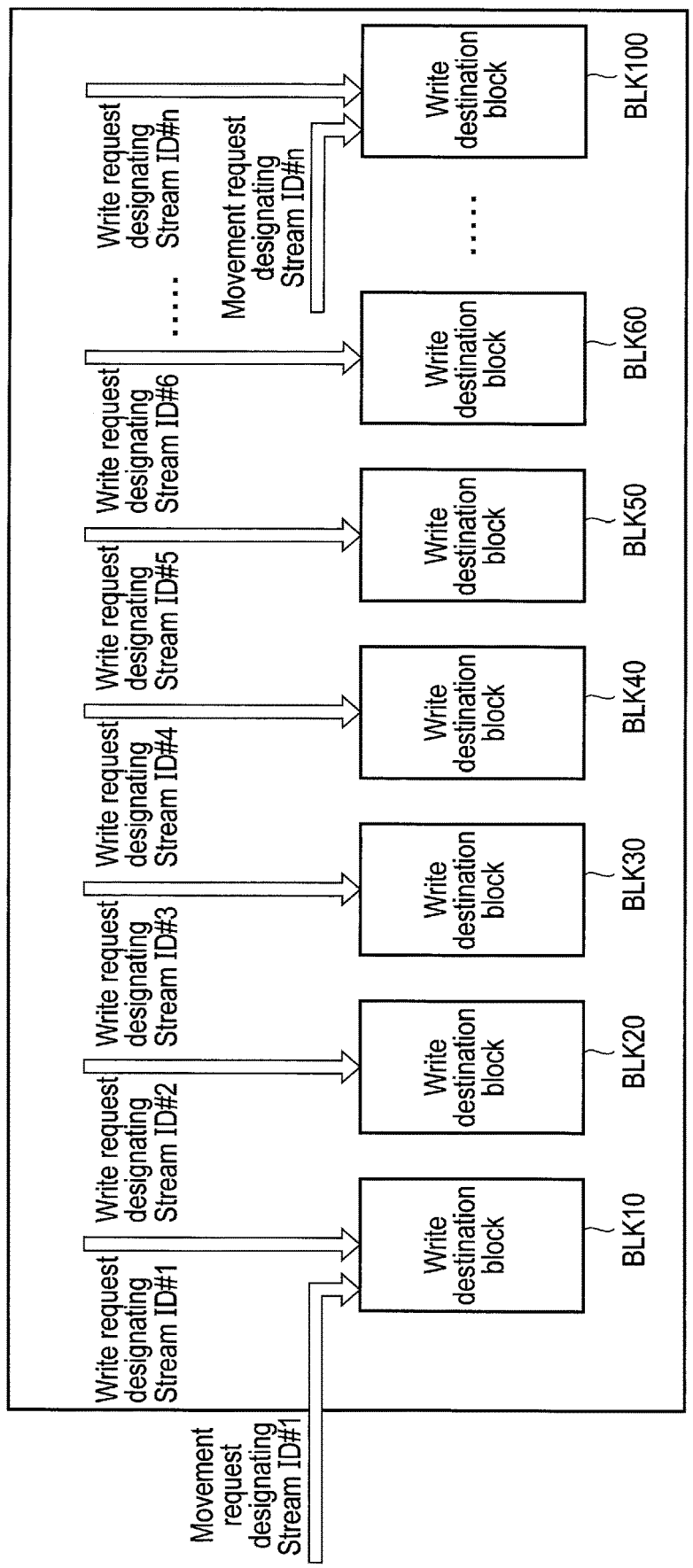
F I G. 4

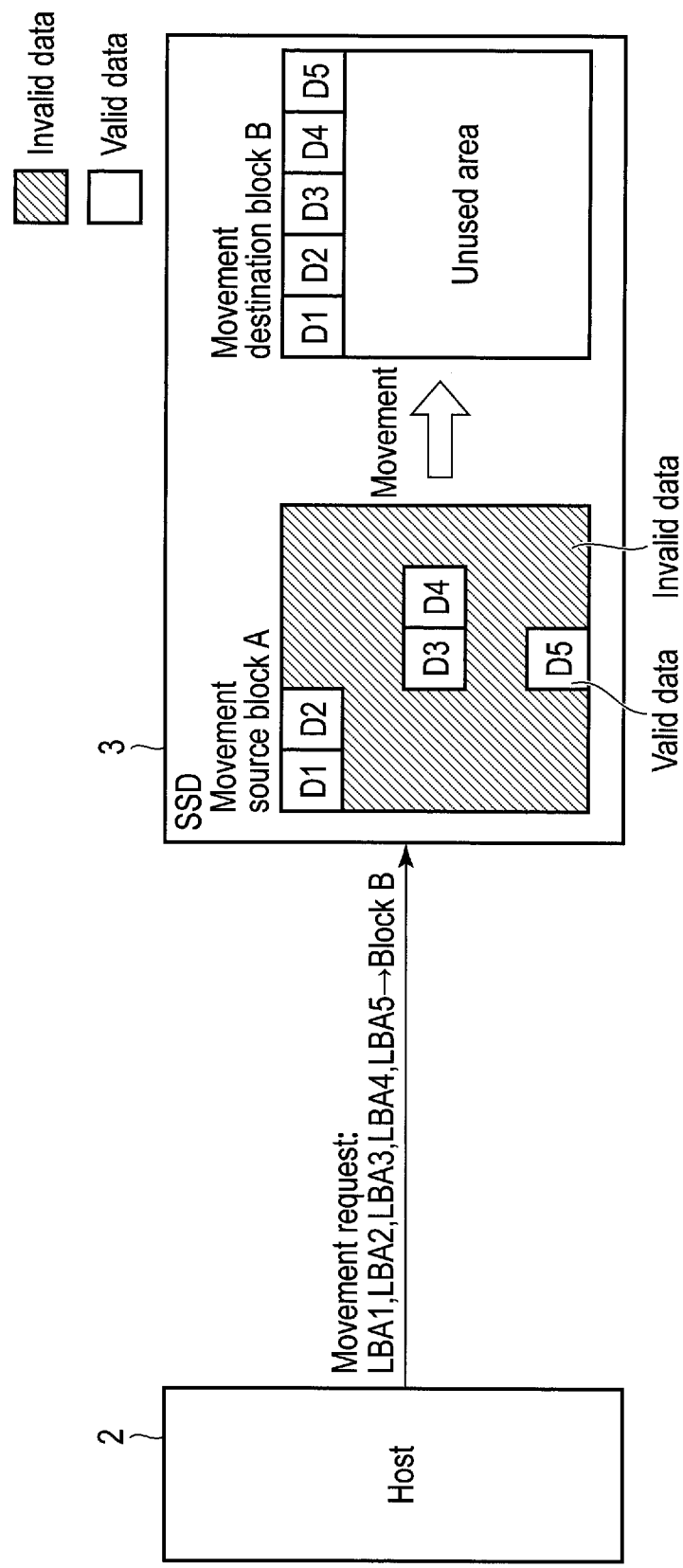
F I G. 5

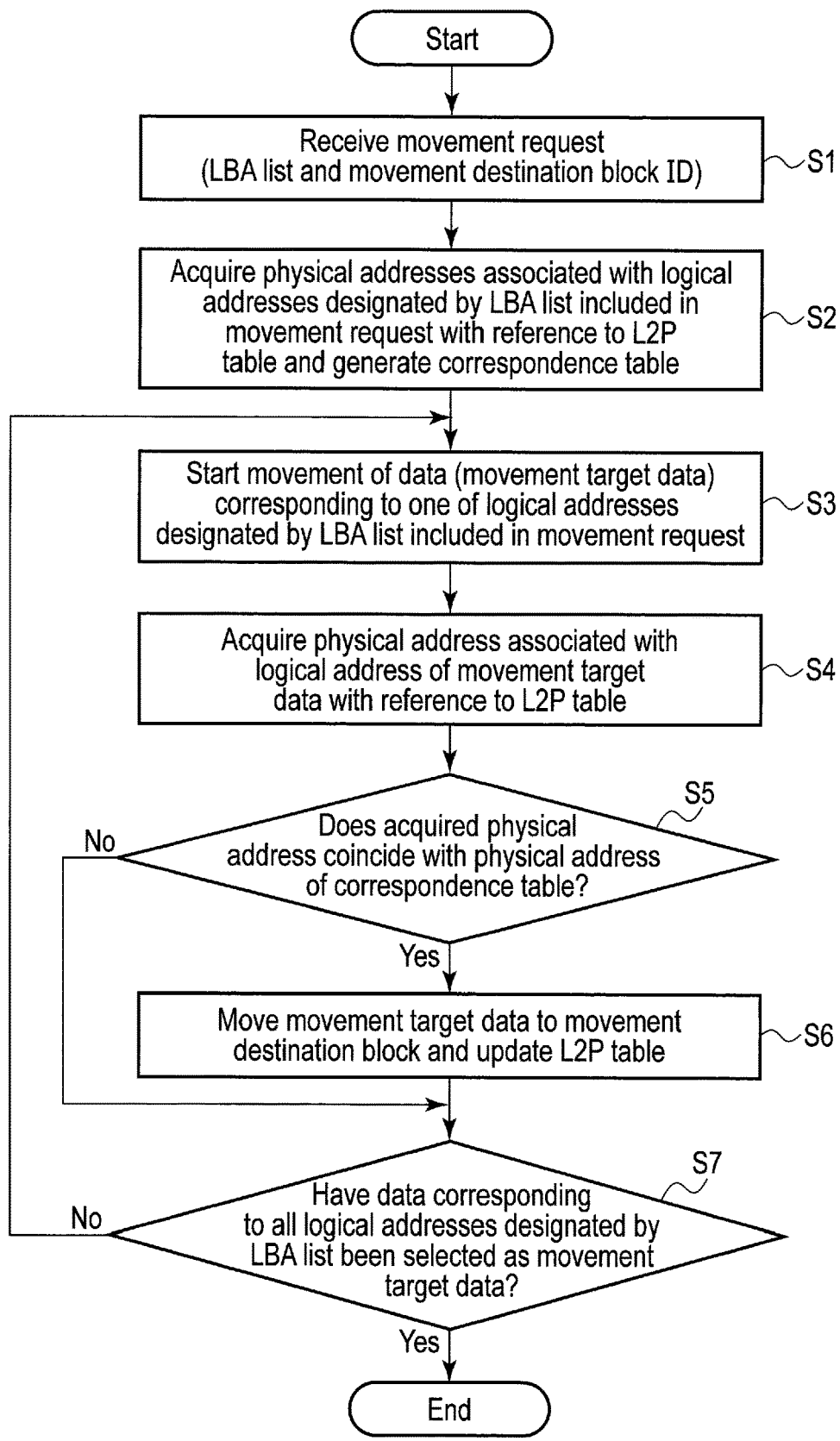
F I G. 11

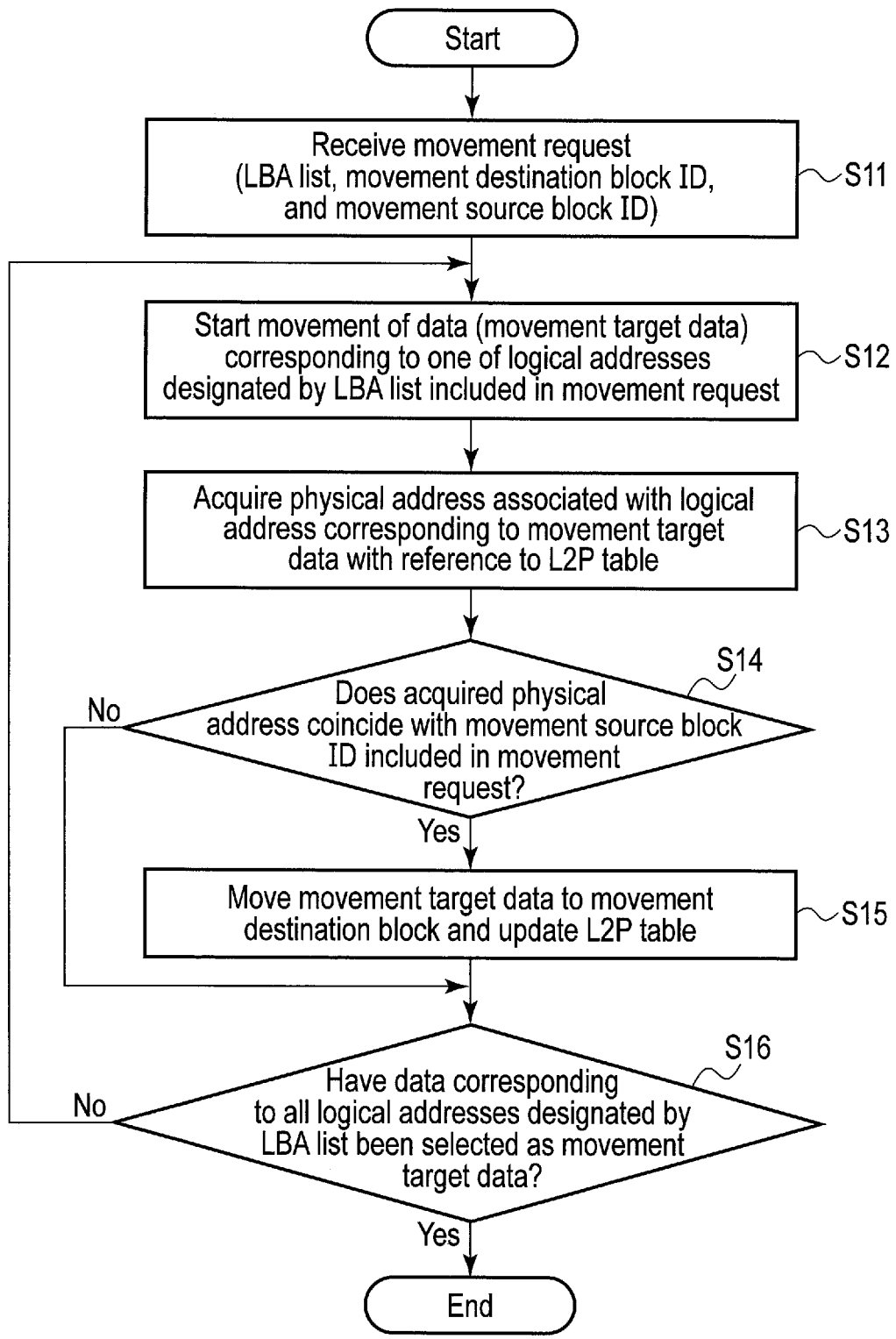
F I G. 14

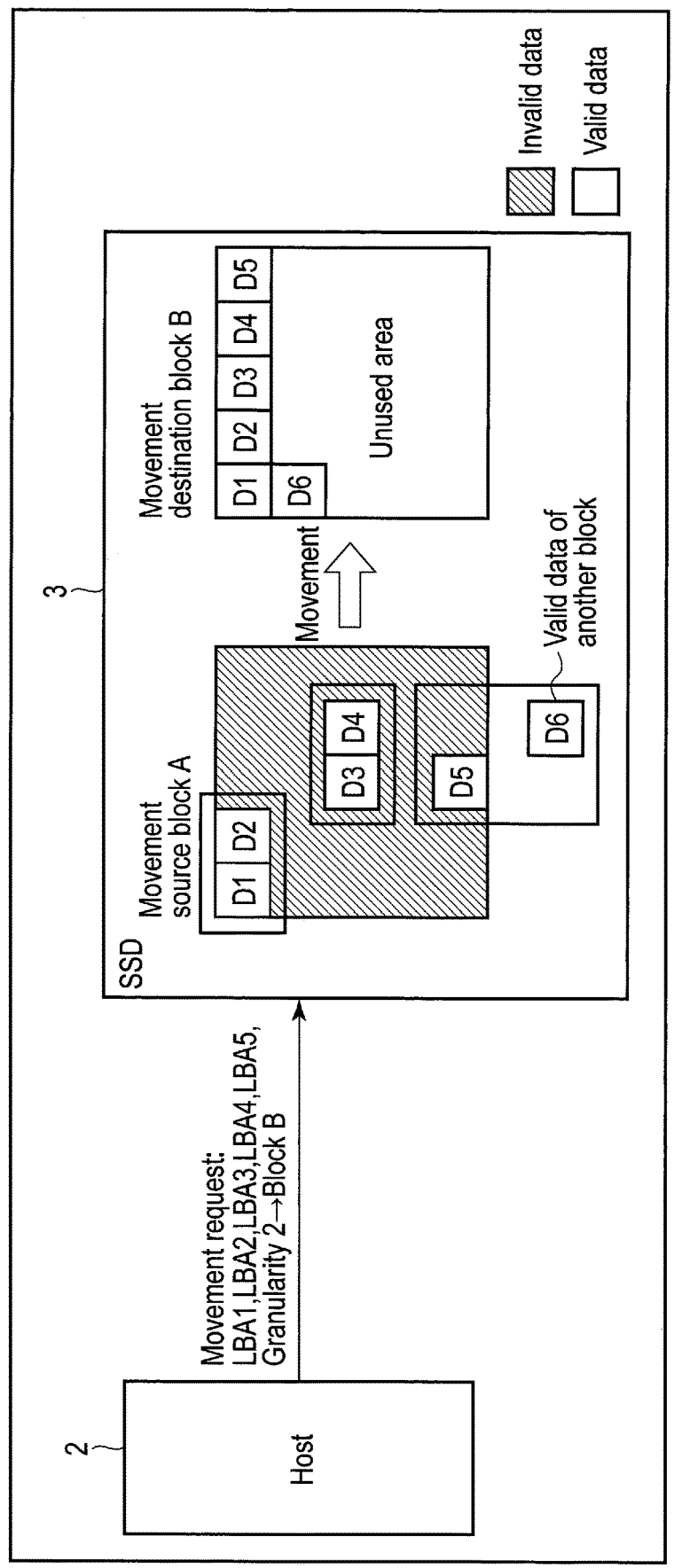
F I G. 15

MEMORY SYSTEM AND METHOD OF CONTROLLING NONVOLATILE MEMORY

CROSS-REFERENCE TO RELATED APPLICATIONS

This application is based upon and claims the benefit of priority from Japanese Patent Application No. 2019-167659, filed Sep. 13, 2019, the entire contents of which are incorporated herein by reference.

FIELD

Embodiments described herein relate generally to a technique of controlling a nonvolatile memory.

BACKGROUND

In recent years, memory systems including a nonvolatile memory have been widely used. As one of such memory systems, a NAND flash technology-based solid state drive (SSD) has been known.

The SSDs are used as storage devices of various host computer systems such as servers of data centers.

In the SSD, implementation of a system of efficiently controlling data placement in the nonvolatile memory is required.

BRIEF DESCRIPTION OF THE DRAWINGS

FIG. 1 is a block diagram illustrating a configuration example of a memory system according to a first embodiment.

FIG. 2 is a table illustrating an example of a movement request issued to the memory system according to the first embodiment, the movement request designating a logical address of movement target data and an identifier of a movement destination block.

FIG. 3 is a table illustrating another example of the movement request issued to the memory system according to the first embodiment.

FIG. 4 illustrates a configuration in which one of a plurality of write destination blocks is used as a movement destination block, the write destination blocks being allocated to streams used for a stream write process.

FIG. 5 is a diagram illustrating an outline of a movement process executed in the memory system according to the first embodiment, in response to reception of a movement request from a host.

FIG. 11 is a flowchart illustrating a procedure of a movement process executed in the memory system according to the first embodiment.

FIG. 14 is a flowchart illustrating a procedure of a movement process executed in the memory system according to the second embodiment.

FIG. 15 is a diagram illustrating an outline of a movement process executed in a memory system according to a third embodiment, in response to reception of a movement request from a host.

DETAILED DESCRIPTION

Figure 6:
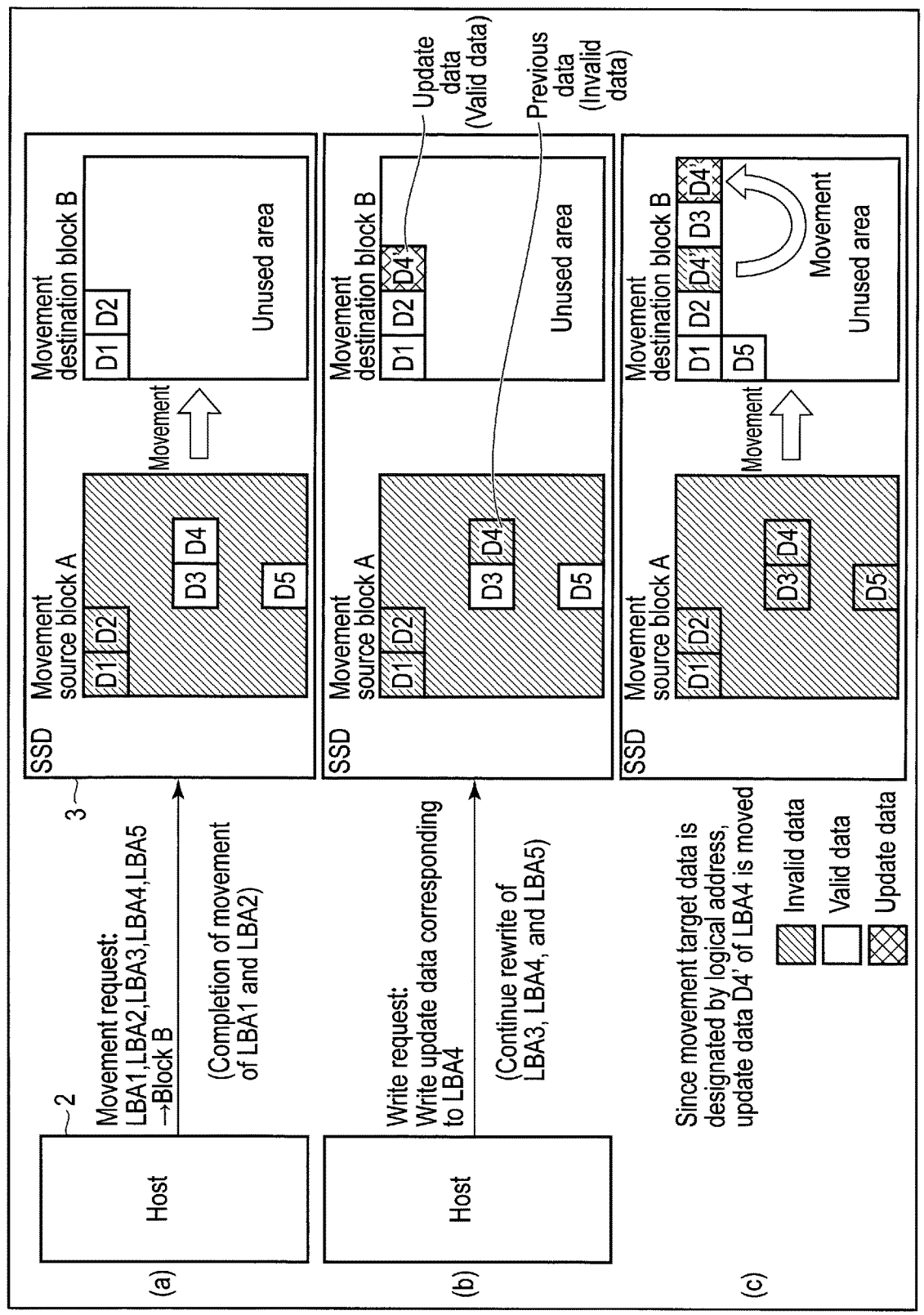
FIG. 6 is a diagram illustrating unnecessary data movement that may occur when movement target data is updated.

Various embodiments will be described hereinafter with reference to the accompanying drawings.

In general, according to one embodiment, a memory system is connectable to a host. The memory system includes a nonvolatile memory that includes a plurality of blocks, and a controller electrically connected to the nonvolatile memory and configured to control the nonvolatile memory. The controller receives a movement request from the host, the movement request designating a logical address of movement target data. When update data corresponding to the designated logical address is not written to the nonvolatile memory by a write request from the host in a period from the reception of the movement request to start of movement of data corresponding to the designated logical address, the controller executes a movement process of moving data stored in a physical address of the nonvolatile memory associated with the designated logical address to a movement destination block in the nonvolatile memory. The physical address is obtained by referring to a logical-to-physical address conversion table. When the update data is written to the nonvolatile memory in the period, the controller does not execute the movement process.

Hereinafter, embodiments will be described with reference to the drawings.

First Embodiment

FIG. 1 is a block diagram illustrating a configuration example of a memory system according to a first embodiment.

This memory system is a semiconductor storage device configured to write data to a nonvolatile memory and read data from the nonvolatile memory. This memory system is realized as a NAND flash technology-based solid state drive (SSD) 3.

The information processing system 1 includes a host (e.g., a host device) 2 and the SSD 3. The host 2 is realized by an information processing apparatus configured to use the SSD 3 as a storage. The information processing apparatus may be a computer such as a personal computer or a server computer, may be a portable terminal such as a tablet or a smartphone, or may be an a vehicle-mounted terminal such as a car navigation system.

The SSD 3 can be used as an external storage device of the information processing apparatus that functions as the host 2. The SSD 3 may be built in the information processing apparatus, or may be connected to the information processing apparatus through a cable or a network.

An interface for interconnecting the host 2 and the SSD 3 may be PCI Express (PCIe) (registered trademark), NVM Express (NVMe) (registered trademark), Ethernet (registered trademark), NVMe over Fabrics (NVMeOF) or the like, but is not limited thereto.

The SSD 3 includes a controller 4 and a nonvolatile memory (e.g., a NAND flash memory) 5. The SSD 3 may include a random access memory, for example, a dynamic random access memory (DRAM) 6.

The NAND flash memory 5 includes a memory cell array including a plurality of memory cells arranged in a matrix form. The NAND flash memory 5 may be a NAND flash memory of a two-dimensional structure or may be a NAND flash memory of a three-dimensional structure.

The memory cell array of the NAND flash memory 5 includes a plurality of blocks BLK0 to BLKm−1. Each of the blocks BLK0 to BLKm−1 includes a plurality of pages (here, pages P0 to Pn−1). Each of the blocks BLK0 to BLKm−1 is a unit for erasing data. The block may also be referred to as an "erasure block (erase block)", a "physical block", or a "physical erasure block (physical erase block)". Each of the pages P0 to Pn−1 is a unit for writing (i.e., programming) and reading data.

The controller 4 is electrically connected to the NAND flash memory 5, which is the nonvolatile memory, through a NAND interface 13 such as a Toggle NAND flash interface or an open NAND flash interface (ONFI). The controller 4 operates as a memory controller configured to control the NAND flash memory 5. The controller 4 may be realized by a circuit such as a system-on-a-chip (SoC).

The NAND flash memory 5 may include a plurality of NAND flash memory chips (e.g., NAND flash memory dies). In this case, the NAND interface 13 may be connected to the plurality of NAND flash memory chips through a plurality of channels Ch, respectively.

The controller 4 can function as a flash translation layer (FTL) configured to execute data management of the NAND flash memory 5 and block management of the NAND flash memory 5. Data management executed by this FTL includes (1) management of mapping information indicating a correspondence relationship between each of logical addresses and each of physical addresses of the NAND flash memory 5, (2) processing for concealing restrictions (for example, read/write operations in units of pages and erase operations in units of blocks) of the NAND flash memory 5, and the like. The logical addresses are addresses used by the host 2 for addressing locations within a logical address space of the SSD 3. In general, a logical block address (LBA) can be used as the logical address.

Management of mapping information between each of the logical addresses used by the host 2 to access the SSD 3 and each of the physical addresses of the NAND flash memory 5 is executed using an address conversion table (e.g., a logical-to-physical address conversion table: L2P table) 31. The controller 4 manages mapping between each of the logical addresses and each of the physical addresses in a unit of a given management size, by using the L2P table 31. A physical address corresponding to a certain logical address indicates the latest physical storage location in the NAND flash memory 5 in which data corresponding to the logical address is written. The L2P table 31 may be loaded from the NAND flash memory 5 to the DRAM 6 when the SSD 3 is powered on. The entirety of the L2P table 31 may be loaded into the DRAM 6 when the SSD 3 is powered on, or a necessary part of the L2P table 31 may be loaded each time during the operation of the SSD 3.

In the NAND flash memory 5, data can be written to a page only once per erase cycle. That is, new data cannot be directly overwritten in an area in a block in which data has already been written. For this reason, when updating (changing) the data that has already been written, the controller 4 writes new data (update data) in an unused area (unwritten area) in the block (or another block), and handles the previous data as invalid data. In other words, the controller 4 writes the update data corresponding to a certain logical address to another physical storage location rather than a physical storage location where the previous data corresponding to this logical address is stored. The controller 4 updates the L2P table 31 to associate this logical address with the other physical storage location and invalidate the previous data.

The block management includes management of defective blocks, wear leveling, garbage collection (GC), and the like. The GC may also be referred to as "compaction". The wear leveling is an operation for leveling the number of times of rewrite (the number of program/erase cycles) of the blocks. The GC is an operation for increasing the number of free blocks. The free block is a block that does not contain valid data. In the GC, the controller 4 moves valid data in a block in which the valid data and invalid data are mixed with each other to another block (for example, a free block). The controller 4 updates the L2P table 31 to map a physical address of a movement destination to a logical address of the moved valid data. A block having only the invalid data after moving the valid data to the other block is released as a free block. Thus, this block can be reused for writing data after an erase operation for this block is executed.

Here, the valid data means data associated with a certain logical address. For example, data referred from the L2P table 31 (that is, data associated as the latest data with a certain logical address) is the valid data, and is likely to be read from the host 2 later. The invalid data means data that is not associated with any logical address. The data that is not associated with any logical address is data that is no longer likely to be read from the host 2.

As such, the controller 4 reads certain data from a movement source block and writes the read data to a movement destination block. The controller 4 updates the L2P table 31 such that a physical address to be associated with a logical address of this data is changed from a physical address of the movement source to a physical address of the movement destination. Therefore, data existing in the physical address of the movement source is invalidated, and the data is thus moved from the physical address of the movement source to the physical address of the movement destination while maintaining the logical address of the data.

Information such as a lifetime of data written to the SSD 3 is more accurately understood by the host 2 as compared with the SSD 3 itself. For that reason, it is expected that when a movement process for the GC etc., (i.e., a process of moving data while maintaining the logical address of the data) is performed by an instruction of the host 2, performance of the SSD 3 is improved in terms of a write amplification factor (WAF) etc. Here, the lifetime of the data means a period from a point in time when the data is generated to a point in time when the data is invalidated by deletion or update (e.g., change). If data having the same or similar lifetime could be stored in the same block, all the data stored in this block are highly likely to be invalidated by deletion or update (e.g., change) almost simultaneously. With respect to a block in which all the data are invalidated, this block can be made a free block only by executing an erase operation on this block without moving the valid data to another block. Therefore, by executing the movement process based on the instruction of the host 2, data placement that takes into account the lifetime of data, such as storing of data having the same or similar lifetime in the same block, can be realized. As a result, an amount of data written to the NAND flash memory 5 for the GC etc., can be reduced, and it is thus possible to lower the WAF.

The host 2 instructs the controller 4 of the SSD 3 to move specific data by sending a movement request to the SSD 3. Note that details of the movement process performed by control of the host 2 will be described later, and a detailed description thereof is thus omitted here.

The controller 4 includes a host interface 11, a central processing unit (CPU) 12, a NAND interface 13, a DRAM interface 14, a direct memory access controller (DMAC) 15, an internal buffer 16, an error correction code (ECC) encoder/decoder 17, and the like. The host interface 11, the CPU 12, the NAND interface 13, the DRAM interface 14, the direct memory access controller (DMAC) 15, the internal buffer 16, and the ECC encoder/decoder 17 are interconnected through a bus 10.

The host interface 11 is a host interface circuit configured to execute communication with the host 2. The host interface 11 may be, for example, a PCIe controller (e.g., an NVMe controller). Alternatively, in a configuration in which the SSD 3 is connected to the host 2 through Ethernet (registered trademark), the host interface 11 may be an NVMe over Fabrics (NVMeOF) controller.

The host interface 11 receives various commands from the host 2. These commands include a write command (e.g., a write request), a read command (e.g., a read request), a movement command (e.g., a movement request), and various other commands.

The write command is a command (e.g., a write request) for writing data to be written (write data) to the SSD 3, and includes a logical address (e.g., a start LBA) of the write data, a length of the write data, a data pointer (e.g., a buffer address) indicating a location in a write buffer in a memory of the host 2 where the write data is stored, and the like.

The read command is a command (e.g., a read request) for reading data from the SSD 3, and includes a logical address (e.g., a start LBA) of the data to be read, a length of this data, a data pointer (e.g., a buffer address) indicating a location in a read buffer in the memory of the host 2 to which this data is to be transferred, and the like.

The movement command is a command (e.g., a movement request) for moving data (e.g., movement target data) from a movement source block included in the NAND flash memory 5 to a movement destination block included in the NAND flash memory 5, and designates logical addresses of the movement target data. Note that the movement command may include not only the logical addresses of the movement target data but also a parameter that designates the movement destination block to which the movement target data is to be moved. The parameter that designates the movement destination block may be an identifier of the movement destination block. Specifically, the movement command may include, for example, a command code, an LBA list, and an identifier of the movement destination block, as shown in FIG. 2. The command code indicates a command code of the movement request. The LBA list includes one or more LBAs, each of the one or more LBAs designating movement target data. The identifier of the movement destination block is, for example, a block address of the movement destination block. Hereinafter, the identifier of the movement destination block is referred to as a movement destination block ID.

Alternatively, the movement command may include an identifier (i.e., stream ID) for identifying a stream instead of the movement destination block ID described above, as shown in FIG. 3. In this case, a block allocated to the stream identified by the stream ID included in the movement command is determined as the movement destination block to which the movement target data is to be moved. Note that the streams are used for roughly classifying the plurality of blocks included in the NAND flash memory 5 by purpose. The streams may include, for example, a stream associated with data having a long lifetime, a stream associated with data having a short lifetime, or the like. Generally, a write command for executing stream writing is known. In the stream writing, write data associated with a write command that designates a certain stream ID is written to a write destination block allocated to a stream of this stream ID, and write data associated with a write command that designates another stream ID is written to another write destination block allocated to a stream of the other stream ID. Streams each of which is used for determining a block to be used as the movement destination block may be the same as streams which are allocated to the write destination blocks. Alternatively, the streams each of which is used for determining a block to be used as the movement destination block may be defined as separate streams different from streams allocated to the write destination blocks.

The CPU 12 is a processor configured to control the host interface 11, the NAND interface 13, and the DRAM interface 14. The CPU 12 loads a control program (e.g., firmware) from the NAND flash memory 5 or a read only memory (ROM) (not shown) into the DRAM 6 in response to the power-on of the SSD 3, and executes various processes by executing this firmware. Note that the firmware may be loaded on a static random access memory (SRAM) (not shown) in the controller 4. The CPU 12 can execute command processes etc., for processing various commands from the host 2. An operation of the CPU 12 is controlled by the above-described firmware. Note that some or all of the command processes may be executed by dedicated hardware in the controller 4.

In the controller 4, a write control unit 21, a read control unit 22, and a movement control unit 23 exist as components for realizing the FTL. The write control unit 21, the read control unit 22, and the movement control unit 23 may be realized by the above-described firmware executed by the CPU 12. Note that some or all of the write control unit 21, the read control unit 22, and the movement control unit 23 may be realized by dedicated hardware in the controller 4.

The write control unit 21 executes a process for writing the write data associated with the write command to the NAND flash memory 5 according to the write command (e.g., the write request) received from the host 2. In a case where the controller 4 is configured to receive the movement command having the form shown in FIG. 3 from the host 2, the write control unit 21 supports the above-described stream writing operation. The write control unit 21 allocates a plurality of write destination blocks corresponding to a plurality of streams from the plurality of blocks of the NAND flash memory 5, and manages the plurality of write destination blocks that are allocated. Note that when the movement command received from the host 2 is only the movement command having the form shown in FIG. 2 and the movement command having the form shown in FIG. 3 is not received from the host 2, the write control unit 21 may not support the above-described stream write operation.

The read control unit 22 receives the read command from the host 2, and reads data designated by the received read command from the NAND flash memory 5.

The movement control unit 23 receives the movement command (e.g., the movement request) from the host 2, and moves the movement target data corresponding to each of the logical addresses designated by the LBA list included in the received movement command to the movement destination block designated by the movement destination block ID or the stream ID included in the received movement command among the plurality of blocks of the NAND flash memory 5. Note that when the movement command does not include the parameter (e.g., the movement destination block ID or the stream ID) that designates the movement destination block, the movement control unit 23 may determine the movement destination block.

The NAND interface 13 is a memory control circuit configured to control the NAND flash memory 5 under the control of the CPU 12.

The DRAM interface 14 is a DRAM control circuit configured to control the DRAM 6 under the control of the CPU 12. A part of a memory area of the DRAM 6 may be used as a memory area for the L2P table 31.

The DMAC 15 executes data transfer between the memory of the host 2 and the internal buffer 16 under the control of the CPU 12. When the write data is to be transferred from the write buffer in the memory of the host 2 to the internal buffer 16, the CPU 12 designates a transfer source address indicating a location on the write buffer in the memory of the host 2, a data size, and a transfer destination address indicating a location on the internal buffer 16 for the DMAC 15.

The ECC encoder/decoder 17 adds an error correction code (ECC) as a redundant code to data (e.g., data to be written) by encoding (e.g., ECC-encoding) the data when the data is to be written to the NAND flash memory 5. When the data is read from the NAND flash memory 5, the ECC encoder/decoder 17 performs error correction of the data using the ECC added to the read data (i.e., ECC decode).

FIG. 4 illustrates a configuration in which one of a plurality of write destination blocks is used as a movement destination block, the write destination blocks being allocated to streams used for a stream write process.

In FIG. 4, a case where a write destination block BLK10 is associated with a stream having a stream ID #1, a write destination block BLK20 is associated with a stream having a stream ID #2, a write destination block BLK30 is associated with a stream having a stream ID #3, a write destination block BLK40 is associated with a stream having a stream ID #4, a write destination block BLK50 is associated with a stream having a stream ID #5, a write destination block BLK60 is associated with a stream having a stream ID #6, and a write destination block BLK100 is associated with a stream having a stream ID #n is illustrated. When a write destination block for a certain stream is filled with data, a free block is allocated as a new write destination block for this stream, and this new write destination block is subsequently used as a write destination block for this stream.

Write data associated with a write request including the stream ID #1 are written to the write destination block BLK10, write data associated with a write request including the stream ID #2 are written to the write destination block BLK20, and write data associated with a write request including the stream ID #n are written to the write destination block BLK100.

In addition, in FIG. 4, a case where the write destination block BLK10 for the stream having the stream ID #1 is also associated as a movement destination block BLK10 for the stream having the stream ID #1 and the write destination block BLK100 for the stream having the stream ID #n is also associated as a movement destination block BLK100 for the stream having the stream ID #n is illustrated. Note that, for convenience of explanation, although not shown in FIG. 4, write destination blocks BLK20 to BLK60 for streams having stream ID #2 to stream ID #6 are also associated as movement destination blocks BLK20 to BLK60 for the streams having the stream ID #2 to the stream ID #6, respectively.

Movement target data designated by a movement request including the stream ID #1 are moved to the movement destination block BLK10, movement target data designated by a movement request including the stream ID #2 are moved to the movement destination block BLK20, and movement target data designated by a movement request including the stream ID #n are moved to the movement destination block BLK100.

FIG. 5 is a diagram illustrating an outline of a movement process executed in the memory system according to the first embodiment, in response to reception of a movement request from a host 2. In more detail, FIG. 5 shows an operation in which the controller 4 of the SSD 3 receives the movement request from the host 2 and moves the movement target data from the movement source block to the movement destination block according to the received movement request.

The movement request from the host 2 includes the LBA list, the movement destination block ID (or the stream ID), and the like, in addition to the command code of the movement request, as described above. Note that various operations of the controller 4 of the SSD 3 in a case where the movement request from the host 2 includes the movement destination block ID will hereinafter be mainly described, but also in a case where the movement request from the host 2 including the stream ID, the controller 4 can be similarly operated.

In FIG. 5, a case where the movement request from the host 2 includes an LBA list indicating LBA1, LBA2, LBA3, LBA4, and LBA5 as logical addresses corresponding to the movement target data, a movement destination block ID indicating a block B as a block to which the movement target data are to be moved, and the like, in addition to the command code of the movement request, is illustrated. In addition, in FIG. 5, a case where data corresponding to LBA1 is data D1, data corresponding to LBA2 is data D2, data corresponding to LBA3 is data D3, data corresponding to LBA4 is data D4, and data corresponding to LBA5 is data D5 is illustrated.

First, the controller 4 recognizes that data corresponding to logical addresses designated by the LBA list are movement target data with reference to the LBA list included in the received movement request, and recognizes a movement destination block of the movement target data with reference to the movement destination block ID included in the movement request. The controller 4 starts a movement process of sequentially moving the movement target data to an unused area in the movement destination block.

Specifically, the controller 4 recognizes the latest physical storage location (i.e., the movement source block) in the NAND flash memory 5 in which the movement target data are written with reference to the L2P table 31 stored in the DRAM 6, and moves the movement target data from the movement source block to the movement destination block. The controller 4 updates the L2P table 31 such that the physical addresses of the movement destination are associated with logical addresses of the movement target data, and handles the movement target data as valid data in the movement destination block and handles the previous data contained in the movement source block as invalid data by such update.

In a case of FIG. 5, the controller 4 recognizes that the data D1 to the data D5 corresponding to LBA1 to LBA5 are the movement target data with reference to the LBA list included in the received movement request. In addition, the controller 4 recognizes that a movement destination block of the movement target data D1 to the movement target data D5 is the block B with reference to the movement destination block ID included in the received movement request. The controller 4 acquires each of physical addresses where the movement target data D1 to the movement target data D5 are stored with reference to the L2P table 31 stored in the DRAM 6, and individually recognizes movement source blocks in which the movement target data D1 to the movement target data D5 are stored, respectively. A case where the movement target data D1 to the movement target data D5 are all (respectively) stored in a block A is illustrated in FIG. 5, but in general, the movement target data D1 to the movement target data D5 may also be stored in different blocks. The controller 4 moves each movement target data from the movement source block in which each movement target data is stored to the movement destination block. As shown in FIG. 5, in the case where the movement target data D1 to the movement target data D5 are stored in the block A, the controller 4 moves the movement target data D1 to the movement target data D5 corresponding to LBA1 to LBA5 from the movement source block A to an unused area in the movement destination block B, and handles the movement target data D1 to the movement target data D5 as valid data in the block B and handles the previous data included in the movement source block A as invalid data. In other words, the controller 4 updates the L2P table 31 such that the physical addresses associated with LBA1 to LBA5 corresponding to the movement target data D1 to the movement target data D5 are changed from physical addresses of the movement source block A to physical addresses of the movement destination block B.

According to the operation of FIG. 5 described above, the movement process can be executed in accordance with the instruction of the host 2, and, for example, a data placement in which data having the same lifetime is stored in the same block can thus be realized.

However, since the movement request from the host 2 designates the logical address of the movement target data, if update data (i.e., new write data) corresponding to this logical address is written to the NAND flash memory 5 by the write request from the host 2 before the movement process of the movement target data is started, it is likely that unnecessary data movement will occur. This will be specifically described below.

FIG. 6 is a diagram illustrating unnecessary data movement that may occur when movement target data is updated. In more detail, FIG. 6 shows unnecessary data movement that can occur when update data corresponding to the designated logical address is written to the NAND flash memory 5 by a write request from the host 2 in a period (i.e., a first period) from a time when the controller 4 of the SSD 3 receives the movement request from the host 2 to a time when movement of data corresponding to the logical address designated by the movement request is started.

Note that in FIG. 6, a case where the movement request from the host 2 includes an LBA list indicating LBA1 to LBA5 as logical addresses corresponding to the movement target data and a movement destination block ID indicating a block B as a block to which the movement target data are to be moved in addition to the command code of the movement request, similar to the case of FIG. 5 described above, is illustrated. In addition, in FIG. 6, a case where data D1 to data D5 corresponding to LBA1 to LBA5 are stored in a block A at a point in time when the movement request is received is illustrated.

First, when the controller 4 recognizes that data corresponding to designated logical addresses are movement target data with reference to the LBA list included in the received movement request and recognizes a movement destination block of the movement target data with reference to the movement destination block ID included in the movement request, the controller 4 starts a movement process of sequentially moving the movement target data to an unused area in the movement destination block. In the movement process, the controller 4 acquires physical addresses of the movement target data from the L2P table 31, reads the movement target data from the physical addresses, and writes the read movement target data in the movement destination block.

In (a) of FIG. 6, a state where a process of moving the data D1 and the data D2 corresponding to LBA1 and LBA2 designated by the received movement request from the movement source block A to the movement destination block B is completed and a process of moving the data D3 to the data D5 corresponding to the LBA3 to LBA5 designated by the received movement request is not started is illustrated. The data D1 and the data D2 whose movement is completed are handled as valid data corresponding to LBA1 and LBA2 in the movement destination block B, and the previous data included in the movement source block A are treated as invalid data. In other words, the controller 4 updates the L2P table 31 such that physical addresses associated with LBA1 and LBA2 corresponding to the data D1 and the data D2 are changed from physical addresses of the movement source block A to physical addresses of the movement destination block B. Note that, here, a case where the L2P table 31 is updated whenever the movement target data is moved from the movement source block to the movement destination block is illustrated, but the L2P table 31 may be updated collectively after a series of movement processes according to the received movement request are completed.

Here, as shown in (b) of FIG. 6, a case where a write request from the host 2 that designates a logical address corresponding to movement target data whose movement is not started is received by the controller 4 is assumed. In (b) of FIG. 6, a case where the write request from the host 2 includes LBA4 or the like as a logical address of the write data (i.e., the update data) is illustrated. In addition, in (b) of FIG. 6, the write data associated with the write request is denoted as update data D4'.

In a case where processes corresponding to various commands received from the host 2 are executed in parallel, there is a possibility that a process for another command will be executed during execution of a process corresponding to a certain command. For this reason, when the write request is received from the host 2 during execution of a series of movement processes corresponding to the movement request, there is a case where write of the write data associated with the write request is executed during the execution of the movement processes. In addition, there is a case where a priority is given to each command. Also in this case, there is a possibility that a process for another command will be executed during execution of a process corresponding to a certain command. Therefore, when the write request from the host 2 that designates the logical address corresponding to the movement target data whose movement is not started is received, there is possibility that the movement target data will be updated (e.g., changed) by a write process corresponding to this write request. In this case, normally, update data (i.e., new write data) is written not to an original physical storage location, but is written to an unused area of a current write destination block. Therefore, the latest data (i.e., valid data) corresponding to the logical address designated by the movement request does not exist in the movement source block A.

That is, when the write request from the host 2 is received, the controller 4 executes a process of writing the update data associated with the received write request as data corresponding to the logical address included in the write request.

In a case of (b) of FIG. 6, the controller 4 writes the update data D4' associated with the received write request as data corresponding to LBA4 included in the write request to an unused area in a certain block. In (b) of FIG. 6, a case where the update data D4' is written in the block B is illustrated, but the update data D4' may be written in an unused area of another block other than the block B. The controller 4 updates the L2P table 31 such that a physical address associated with LBA4 is changed from a physical address of the block A before the update to a physical address of the block B after the update, and handles the update data D4' included in the block B as valid data corresponding to LBA4 and handles the previous data D4 included in the block A as invalid data.

When the controller 4 finishes executing the process corresponding to the write request, the controller 4 continues the process corresponding to the movement request. That is, the controller 4 executes the movement process for moving the movement target data in a state where the movement is not started.

The movement of the data corresponding to LBA1 and LBA2 designated by the received movement request is completed as shown in (a) of FIG. 6, and the controller 4 thus executes a process of moving data corresponding to LBA3 to LBA5 designated by the movement request to the movement destination block B, as shown in (c) of FIG. 6.

In this case, as shown in (c) of FIG. 6, the data D3 and the data D5 corresponding to LBA3 and LBA5 are moved from the movement source block A to the movement destination block B, similarly to the data D1 and the data D2 corresponding to LBA1 and LBA2 described above, but the data D4' corresponding to LBA4 has already been stored in the movement destination block B by the process corresponding to the write request shown in (b) of FIG. 6, and the data D4' is thus moved from the block B to another physical storage location in the block B, as shown in (c) of FIG. 6. This is because when physical addresses corresponding to LBA3 and LBA5 are acquired from the L2P table 31, these physical addresses indicate the movement source block A, but when the physical address corresponding to LBA4 is acquired from the L2P table 31, this physical address indicates the movement destination block B. As such, a process of moving the data already stored in the movement destination block B to the other physical storage location in the same block corresponds to unnecessary data movement, and is an unnecessary process in the GC. In addition, the process of moving the data to the other physical storage location in the same block is not preferable from this viewpoint because a storage area in the block is uselessly used.

In order to suppress such unnecessary data movement from being executed, in the present embodiment, when the movement request from the host 2 is received, the controller 4 executes a process of storing logical addresses designated by the LBA list included in the received movement request and physical addresses associated with the logical addresses in a correspondence table (i.e., a first table) with reference to the L2P table 31 stored in the DRAM 6. When the controller 4 starts the movement of the data corresponding to the logical address designated by the LBA list according to the received movement request, the controller 4 acquires a physical address of the data corresponding to the designated logical address by referring to the L2P table 31, determines whether or not the acquired physical address coincides with a physical address indicated by the correspondence table, and determines whether or not the movement target data has been updated in a period (i.e., a first period) from the reception of the movement request to the start of the movement of the movement target data. Here, the meaning that the movement target data has been updated is that the write data (i.e., the update data) corresponding to the logical address has been written to the NAND flash memory 5 by a write request designating the logical address of the movement target data.

Figure 7:
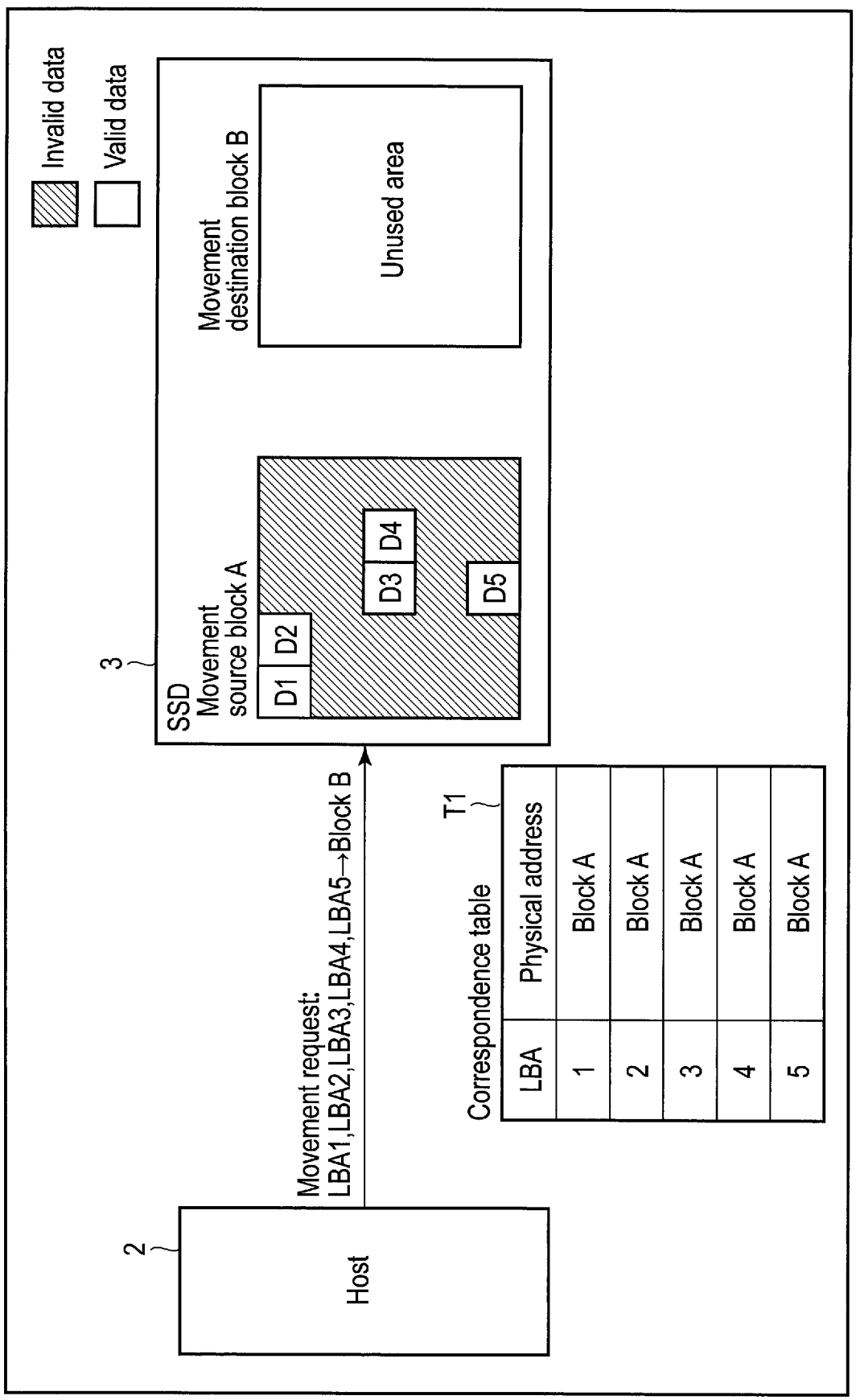
FIG. 7 is a diagram illustrating an operation of storing logical addresses and physical addresses in a correspondence table (i.e., a first table) in response to reception of the movement request from the host.

FIG. 7 is a diagram illustrating an operation of storing logical addresses and physical addresses in a correspondence table (i.e., a first table) in response to reception of the movement request from the host 2. Note that in FIG. 7, a case where the movement request from the host 2 includes an LBA list indicating LBA1 to LBA5 as logical addresses corresponding to the movement target data and a movement destination block ID indicating a block B as a block to which the movement target data are to be moved in addition to the command code of the movement request, similar to the case of FIG. 6 described above, is illustrated. In addition, in FIG. 7, data D1 to data D5 corresponding to LBA1 to LBA5 are stored in a block A at a point in time when the movement request is received, similar to the case of FIG. 6 described above.

When the controller 4 recognizes logical addresses designated by the LBA list included in the received movement request, the controller 4 acquires physical addresses associated with the recognized logical addresses with reference to the L2P table 31 stored in the DRAM 6. Note that, here, a case where physical addresses stored in the correspondence table are an identifier (for example, a block address) of a block indicated by a part of the acquired physical address is assumed. This is because it is sufficient for the controller 4 to be able to know the physical address at a block granularity in order to suppress the unnecessary data movement described above.

In a case of FIG. 7, the controller 4 recognizes that LBA1 to LBA5 are designated by the LBA list included in the received movement request, and acquires an identifier of the block A as physical addresses each associated with the recognized LBA1 to LBA5 with reference to the L2P table 31 in the DRAM 6. Thus, as shown in FIG. 7, a correspondence table T1 in which the identifier of block A is associated with each of LBA1 to LBA5 is generated. The correspondence table T1 is stored in, for example, the DRAM 6.

Figure 8:
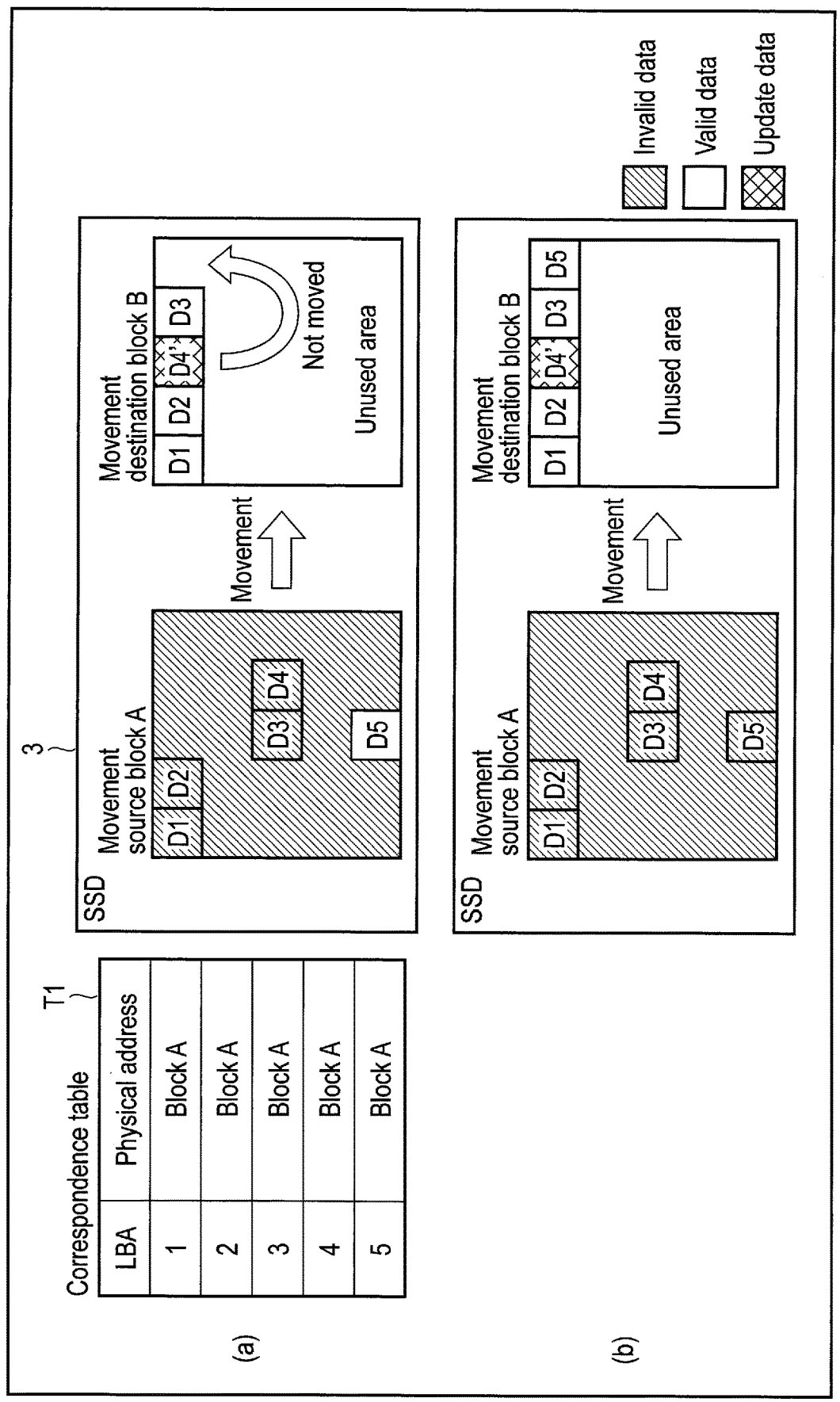
FIG. 8 is a diagram illustrating an operation of omitting, on the basis of the correspondence table, a movement process of movement target data.

FIG. 8 is a diagram illustrating an operation of omitting, on the basis of the correspondence table T1, a movement process of movement target data.

After the correspondence table T1 is generated by the operation shown in FIG. 7, the controller 4 executes a movement process of moving data while sequentially selecting data corresponding to one of the logical addresses designated by the LBA list included in the received movement request as the movement target data.

First, the controller 4 acquires a physical address associated with the logical address of the movement target data with reference to the L2P table 31 stored in the DRAM 6. Then, the controller 4 determines whether or not the movement target data corresponding to the acquired physical address associated with the logical address has been updated during the first period described above based on whether or not the acquired physical address associated with the logical address corresponding to the movement target data and a physical address associated with the logical address in the correspondence table T1 coincides with each other.

In (a) of FIG. 8, a movement process in a case where the data D4' corresponding to LBA4, updated during the first period by the process corresponding to the write request shown in (b) of FIG. 6 described above is the movement target data is illustrated.

In this case, the controller 4 acquires an identifier of the block B as a physical address associated with LBA4 corresponding to the movement target data D4' with reference to the L2P table 31 in the DRAM 6. The controller 4 determines that the data corresponding to LBA4 has been updated during the first period based on the fact that the identifier of the block B acquired as the physical address associated with LBA4 and the identifier of the block A associated with LBA4 in the correspondence table T1 do not coincide with each other, and omits the movement of the movement target data to the movement destination block B. For this reason, as shown in (a) of FIG. 8, the data D4' corresponding to LBA4 is not moved to another physical storage location in the movement destination block B.

As described above, by omitting unnecessary data movement of the data D4' corresponding to LBA4, the data D1 to the data D3 and the data D5 corresponding to LBA1 to LBA3 and LBA5, moved according to the received movement request and the data D4' corresponding to LBA4, updated according to the write request received during the first period are stored in the movement destination block B, as shown in (b) of FIG. 8.

Note that a case where the logical addresses designated by the LBA list included in the received movement request and the physical addresses associated with the logical addresses are stored in the correspondence table T1 in response to the reception of the movement request from the host 2 is illustrated in FIG. 7 described above, but a write flag indicating whether or not the movement target data corresponding to the logical address designated by the received movement request has been updated during the first period may be further stored in the correspondence table T1.

Figure 9:
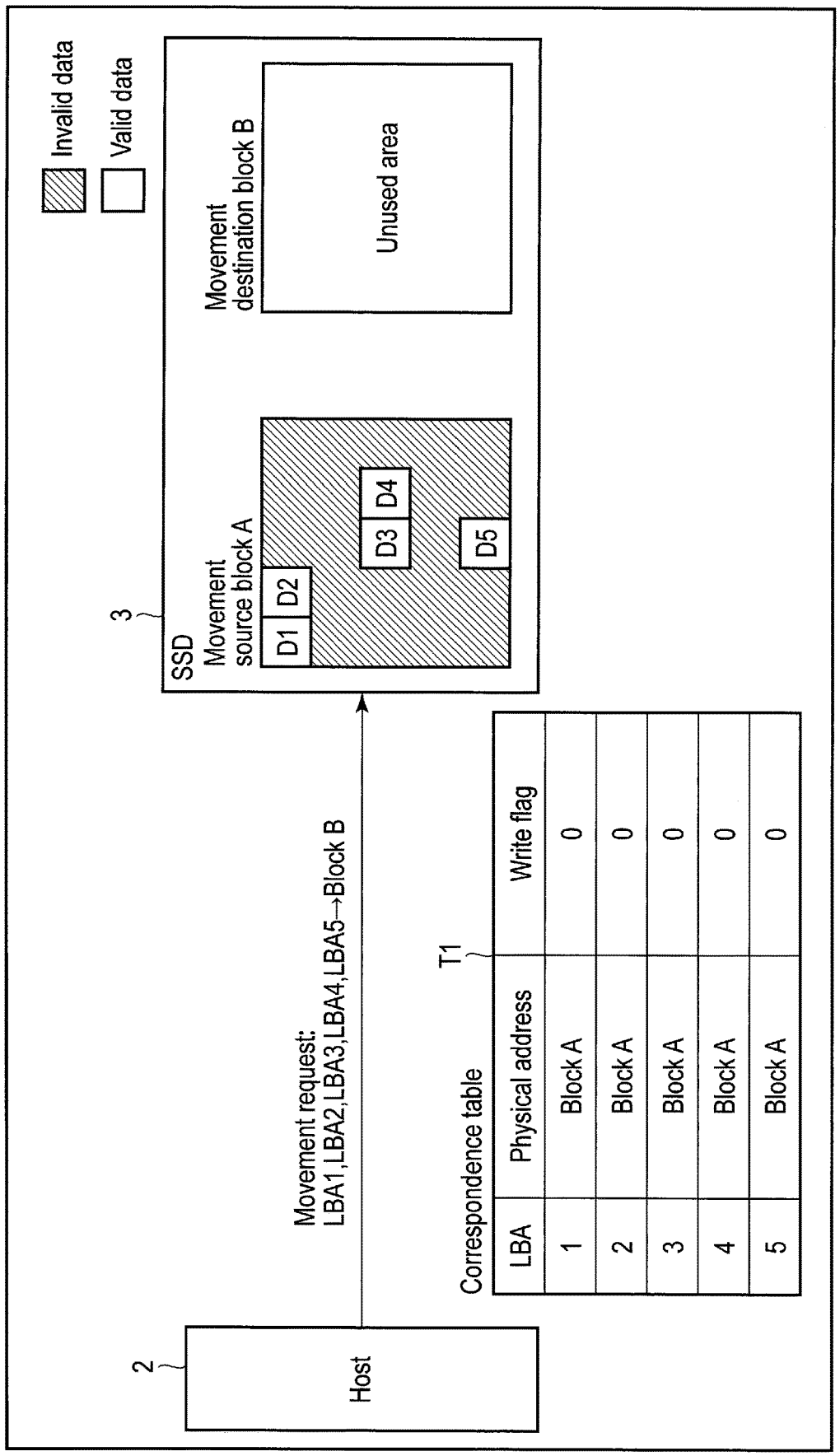
FIG. 9 is a diagram illustrating an operation of storing a write flag in the correspondence table when the movement target data is updated.

FIG. 9 is a diagram illustrating an operation of storing a write flag in the correspondence table T1 when the movement target data is updated. Note that in FIG. 9, a case where the movement request from the host 2 includes an LBA list indicating LBA1 to LBA5 as logical addresses corresponding to the movement target data and a movement destination block ID indicating a block B as a block to which the movement target data are to be moved in addition to the command code of the movement request, similar to the case of FIG. 6 and FIG. 7 described above, is illustrated. In addition, in FIG. 9, data D1 to data D5 corresponding to LBA1 to LBA5 are stored in a block A at a point in time when the movement request is received, similar to the case of FIG. 6 and FIG. 7.

In a case of FIG. 9, when the controller 4 receives the movement request from the host 2, the controller 4 acquires an identifier of the block A as physical addresses each associated with LBA1 to LBA5 designated by the LBA list included in the movement request with reference to the L2P table 31 in the DRAM 6. The controller 4 stores LBA1 to LBA5 designated by the LBA list included in the received movement request and the identifier of the block A acquired as the physical addresses each associated with LBA1 to LBA5 in the correspondence table T1.

Note that a time at which the movement request is received corresponds to a start point in time of the first period and the movement target data D1 to data D5 corresponding to the LBA1 to LBA5 designated by the LBA list included in the movement request are naturally not updated, and the controller 4 thus stores "0 (no update)" as the write flag each associated with LBA1 to LBA5 in the correspondence table T1.

According to the operation shown in FIG. 9, the correspondence table T1 in which the identifier of the block A and the write flag "0" are associated with each of LBA1 to LBA5 is generated. The write flag stored in the correspondence table T1 is updated from "0" to "1 (updated)" by the controller 4 when data corresponding to the associated logical address is updated during the first period.

Figure 10:
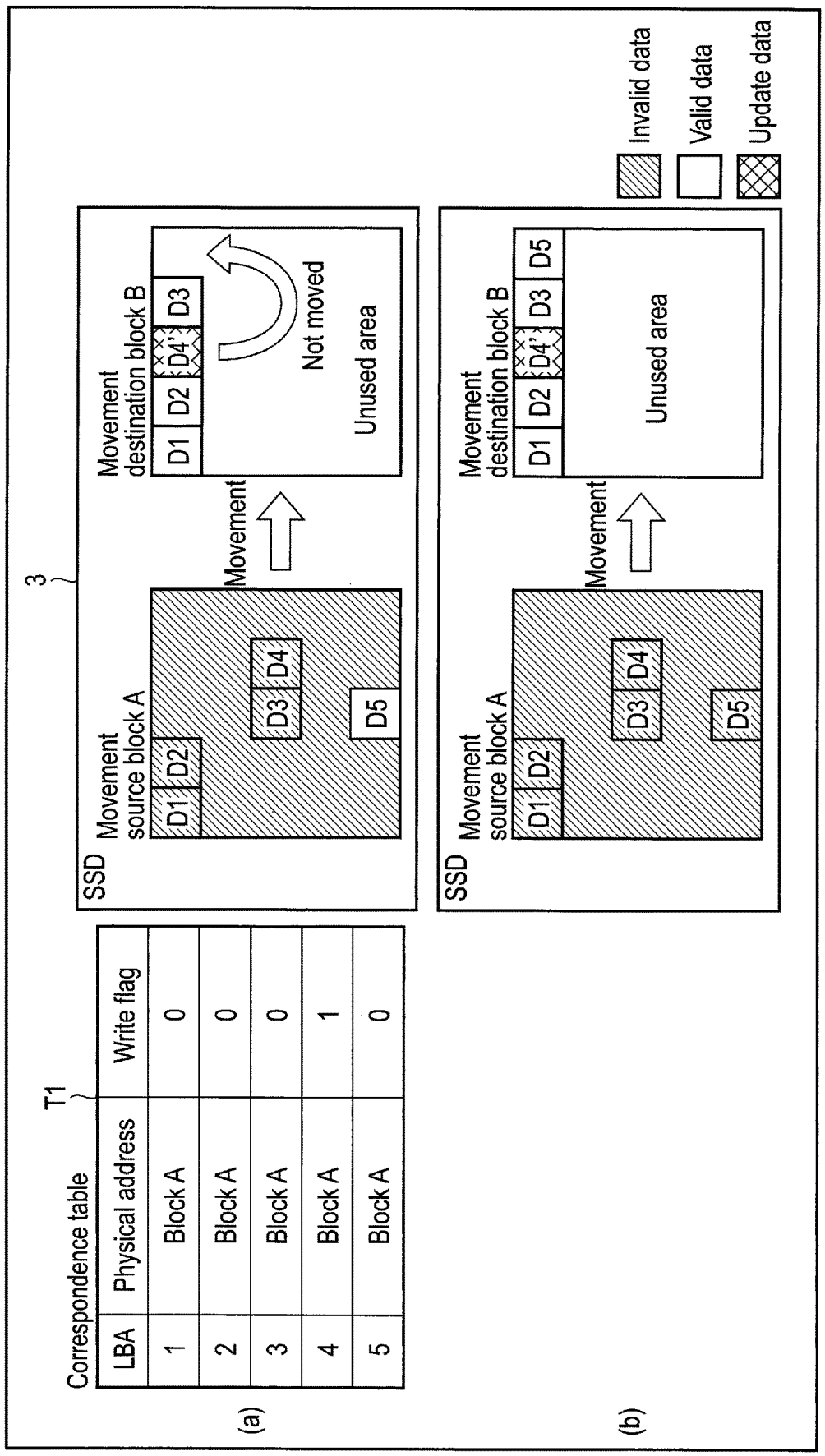
FIG. 10 is a diagram illustrating an operation of omitting a movement process on the basis of the write flag of the correspondence table.

FIG. 10 is a diagram illustrating an operation of omitting a movement process on the basis of the write flag of the correspondence table T1.

After the correspondence table T1 is generated by the operation shown in FIG. 9, the controller 4 executes a movement process of moving data while sequentially selecting data corresponding to one of the logical addresses designated by the LBA list included in the received movement request as the movement target data.

Specifically, the controller 4 determines whether or not the write flag associated with the logical address corresponding to the movement target data is "0" with reference to the correspondence table T1, determines that the movement target data corresponding to the logical address has not been updated during the first period when the write flag is "0", and determines that the movement target data corresponding to the logical address has been updated during the first period when the write flag is "1".

In (a) of FIG. 10, a movement process in a case where the data D4' corresponding to LBA4, updated during the first period by the process corresponding to the write request shown in (b) of FIG. 6 described above is the movement target data is illustrated. Note that the data D4' corresponding to LBA4 is data updated from the previous data D4 by the process corresponding to the write request shown in (b) of FIG. 6, and it is thus assumed that the write flag associated with LBA4 in the correspondence table T1 is updated from "0" to "1", as shown in (a) of FIG. 10.

In this case, the controller 4 determines that the data D4' corresponding to LBA4 has been updated during the first period since the write flag associated with LBA4 corresponding to the movement target data is "1" with reference to the correspondence table T1, and omits the movement of the data D4' to the movement destination block B. For this reason, as shown in (a) of FIG. 10, the data D4' corresponding to LBA4 is not moved to another physical storage location in the movement destination block B.

As described above, by omitting unnecessary data movement of the data D4' corresponding to LBA4, the data D1 to the data D3 and the data D5 corresponding to LBA1 to LBA3 and LBA5, moved according to the received movement request and the data D4' corresponding to LBA4, updated according to the write request received during the first period are stored in the movement destination block B, as shown in (b) of FIG. 10.

As such, when the write flag indicating whether or not the movement target data has been updated during the first period is further stored in the correspondence table T1, the controller 4 can omit unnecessary data movement, similar to the case of FIG. 8 described above. In addition, when the write flag is further stored in the correspondence table T1, a process of acquiring the physical address associated with the logical address corresponding to the movement target data with reference to the L2P table 31 in the DRAM 6 in order to determine whether or not the movement target data has been updated during the first period can be omitted.

As described above, when the write flag is stored in the correspondence table T1, the storage of the physical addresses in the correspondence table T1 may be omitted. That is, the logical addresses designated by the LBA list included in the received movement request and the write flag indicating whether or not the movement target data corresponding to the logical addresses have been updated during the first period may be stored in the correspondence table T1. In this case, at a point in time of generating the correspondence table T1, an acquisition process and a storage processing of the physical addresses associated with the logical addresses designated by the LBA list can be omitted, while at the time of selecting and moving the data corresponding to the logical address associated with the write flag "0" as the movement target data, at this point in time, the physical address associated with the logical address corresponding to the movement target data with reference to the L2P table 31 needs to be acquired. However, even in this case, the controller 4 can omit unnecessary data movement, similar to the case described above.

FIG. 11 is a flowchart illustrating a procedure of a movement process executed in the memory system according to the first embodiment.

First, the controller 4 of the SSD 3 receives the movement request (step S). The LBA list for designating the logical addresses of the movement target data, the movement destination block ID indicating the block to which the movement target data are to be moved, and the like, are included, in addition to the command code, in the movement request.

Then, when the controller 4 receives the movement request, the controller 4 acquires the physical addresses associated with the logical addresses designated by the LBA list included in the received movement request with reference to the L2P table 31 stored in the DRAM 6. The controller 4 stores the logical addresses designated by the LBA list included in the received movement request and the physical addresses acquired from the L2P table 31 in the correspondence table T1 (step S2).

Then, the controller 4 selects data corresponding to one of the logical addresses designated by the LBA list included in the received movement request as the movement target data, and starts movement of the data (step S3).

The controller 4 acquires the physical address associated with the logical address corresponding to the movement target data with reference to the L2P table 31 stored in the DRAM 6 (step S4), and determines whether or not the acquired physical address associated with the logical address corresponding to the movement target data and the physical address associated with the logical address stored in the correspondence table T1 coincide with each other (step S5).

In a process of step S5, when it is determined that the acquired physical address and the physical address stored in the correspondence table T1 do not coincide with each other (No in step S5), the controller 4 omits the movement of the movement target data to the movement destination block, and executes a process of step S7 as described later.

On the other hand, in the process of step S5, when it is determined that the acquired physical address and the physical address stored in the correspondence table T1 coincide with each other (Yes in step S5), the controller 4 moves the movement target data to the movement destination block indicated by the movement destination block ID included in the received movement request, and updates the L2P table 31 such that the physical address associated with the logical address corresponding to the movement target data is changed from the physical address of the movement source block to the physical address of the movement destination block (step S6).

Then, the controller 4 determines whether or not data corresponding to all the logical addresses designated by the LBA list included in the received movement request have been selected as the movement target data (step S7), and determines that the movement of the data based on the received movement request is completed to end a series of processes when it is determined that the data corresponding to all the logical addresses designated by the movement request have been selected as the movement target data (Yes in step S7). On the other hand, when it is determined that the data corresponding to all the logical addresses designated by the movement request have not been selected as the movement target data (No in step S7), the controller 4 performs the process in step S3 described above again, selects data corresponding to a logical address that has not yet been selected as the movement target data as the movement target data, and executes a similar process.

In the first embodiment, the controller 4 of the SSD 3 stores the logical addresses designated by the LBA list included in the received movement request and the physical addresses associated with the logical addresses in the correspondence table T1 in response to the reception of the movement request from the host 2. In addition, when the controller 4 starts the movement of the movement target data corresponding to the logical addresses designated by the LBA list included in the received movement request, the controller 4 acquires the physical address associated with the logical address corresponding to the movement target data from the L2P table 31 in the DRAM 6, determines whether or not the acquired physical address coincides with the physical address stored in advance in the correspondence table T1, and determines whether or not the movement target data has been updated during the first period.

Thus, when the movement target data is updated during the first period, the movement of the movement target data can be omitted, such that it is possible to suppress the unnecessary data movement. On the other hand, the controller 4 of the SSD 3 can move movement target data other than the movement target data updated during the first period to the movement destination block according to the movement request from the host 2, and it is thus possible to improve efficiency of the GC in terms of the WAF etc. Note that in a case where the write flag is stored in the correspondence table T1, when the update data corresponding to a certain logical address is written during the first period, the controller 4 stores the write flag indicating that the update data has been written at a location in the correspondence table T1 corresponding to this logical address. When the controller 4 starts the movement of the data corresponding to this logical address, the controller 4 determines whether or not the update data corresponding to this logical address has been written during the first period, based on whether or not the write flag has been updated at the location in the correspondence table T1 corresponding to this logical address with reference to the correspondence table T1.

Second Embodiment

Next, a second embodiment will be described.

Note that a configuration of an information processing system 1 including a memory system according to a second embodiment is similar to that of the first embodiment.

In the first embodiment, the controller 4 of the SSD 3 receives the movement request including the LBA list and the movement destination block ID from the host 2.

On the other hand, the second embodiment is different from the first embodiment in that a controller 4 of an SSD 3 receives a movement request further including an identifier (that is, a movement source block ID) for identifying a movement source block in which data (i.e., movement target data) corresponding to logical addresses designated by an LBA list are stored, in addition to the LBA list and a movement destination block ID, from a host 2.

Figure 12:
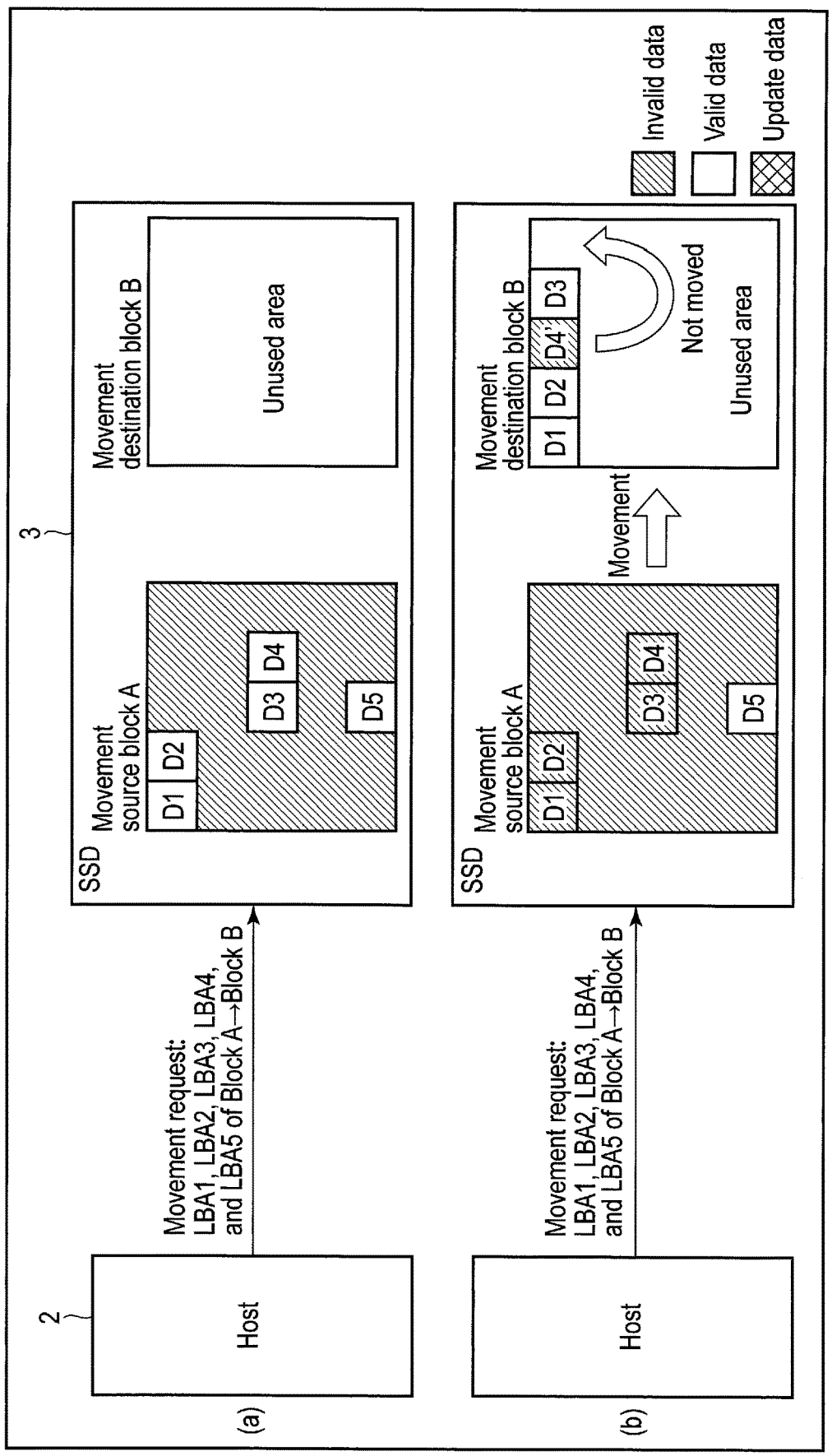
FIG. 12 is a diagram illustrating an outline of a movement process executed in a memory system according to a second embodiment, in response to reception of a movement request from a host.

FIG. 12 is a diagram illustrating an outline of a movement process executed in a memory system according to a second embodiment, in response to reception of a movement request from a host 2.

The movement request from the host 2 includes the LBA list, the movement destination block ID, the movement source block ID, and the like, in addition to a command code of the movement request. In (a) of FIG. 12, a case where the movement request from the host 2 includes an LBA list indicating LBA1 to LBA5 as logical addresses corresponding to the movement target data, a movement destination block ID indicating a block B as a block to which the movement target data are to be moved, a movement source block ID indicating a block A as a block in which the movement target data are stored, and the like, in addition to the command code of the movement request, is illustrated.

When the controller 4 starts the movement process in response to the movement request from the host 2, the controller 4 selects data corresponding to one of the logical addresses designated by the LBA list included in the received movement request as the movement target data, and acquires a physical address associated with the logical address corresponding to the movement target data with reference to an L2P table 31 stored in a DRAM 6.

The controller 4 determines whether or not the movement target data corresponding to the logical address has been updated during the first period described above, based on whether an identifier of a block indicated by a part of the physical address associated with the logical address corresponding to the movement target data and an identifier of the movement source block indicated by the movement source block ID included in the received movement request coincide with each other. Note that a part of the physical address associated with the logical address corresponding to the movement target data is a part of the acquired physical address and corresponds to a physical address (i.e., a block address) of a block granularity.

In (b) of FIG. 12, a movement process in a case where data D4' corresponding to LBA4, updated during the first period by the process corresponding to the write request shown in (b) of FIG. 6 described above is the movement target data is illustrated.

In this case, the controller 4 acquires an identifier of the block B as a physical address associated with LBA4 corresponding to the movement target data D4' with reference to the L2P table 31 in the DRAM 6. The controller 4 determines that the data corresponding to LBA4 has been updated during the first period based on the fact that the identifier of the block B acquired as the physical address associated with LBA4 and an identifier of the block A indicated by the movement source block ID included in the received movement request do not coincide with each other, and omits the movement of the movement target data to the movement destination block B. For this reason, as shown in (b) of FIG. 12, the data D4' corresponding to LBA4 is not moved to another physical storage location in the movement destination block B.

A case where the movement request which is the movement request including the movement source block ID and in which all valid data included in the movement source block are the movement target data is received by the controller 4 is illustrated in FIG. 12, but when all the valid data included in the movement source block are the movement target data as described above, the host 2 may not include the LBA list in the movement request instead of including the movement source block ID in the movement request. When the controller 4 receives the movement request that does not include the LBA list and includes the movement source block ID and the movement destination block ID, the controller 4 selects all the valid data included in the movement source block indicated by the movement source block ID as the movement target data, and move these movement target data to the movement destination block.

A case where the movement source block ID is included in the movement request from the host 2 is illustrated in FIG. 12, but there is a possibility that an identifier of a block included in a NAND flash memory 5 will not be shared between the host 2 and the SSD 3. Here, the meaning that the identifier of the block is not shared between the host 2 and the SSD 3 is that an identifier of each block managed by the host 2 and an identifier of each block managed by the SSD 3 do not coincide with each other. In this case, the host 2 cannot designate the movement source block by the block identifier by the movement request.

For this reason, the host 2 may include a logical address (e.g., a first logical address) corresponding to one of data stored in the movement source block instead of the movement source block ID in the movement request. The data corresponding to the logical address included in the movement request for designating the movement source block may be movement target data, or may be management data different from the movement target data. The management data indicates, for example, a list (e.g., an LBA list) of a plurality of logical addresses each corresponding to a plurality of data portions written into a certain block. One management data is stored in each of a plurality of blocks included in the NAND flash memory 5. The management data stored in each block continues to be maintained in this block until all data portions other than the management data are invalidated in the block.

Note that when the identifier of the block included in the NAND flash memory 5 is not shared between the host 2 and the SSD 3, the host 2 cannot designate the destination block by the movement request, but if at least an instruction to use a block having an unused area as the movement destination block is included in the movement request, the controller 4 of the SSD 3 can move the movement target data to the movement destination block. Alternatively, the movement request may designate the stream ID described above instead of the movement destination block ID.

Figure 13:
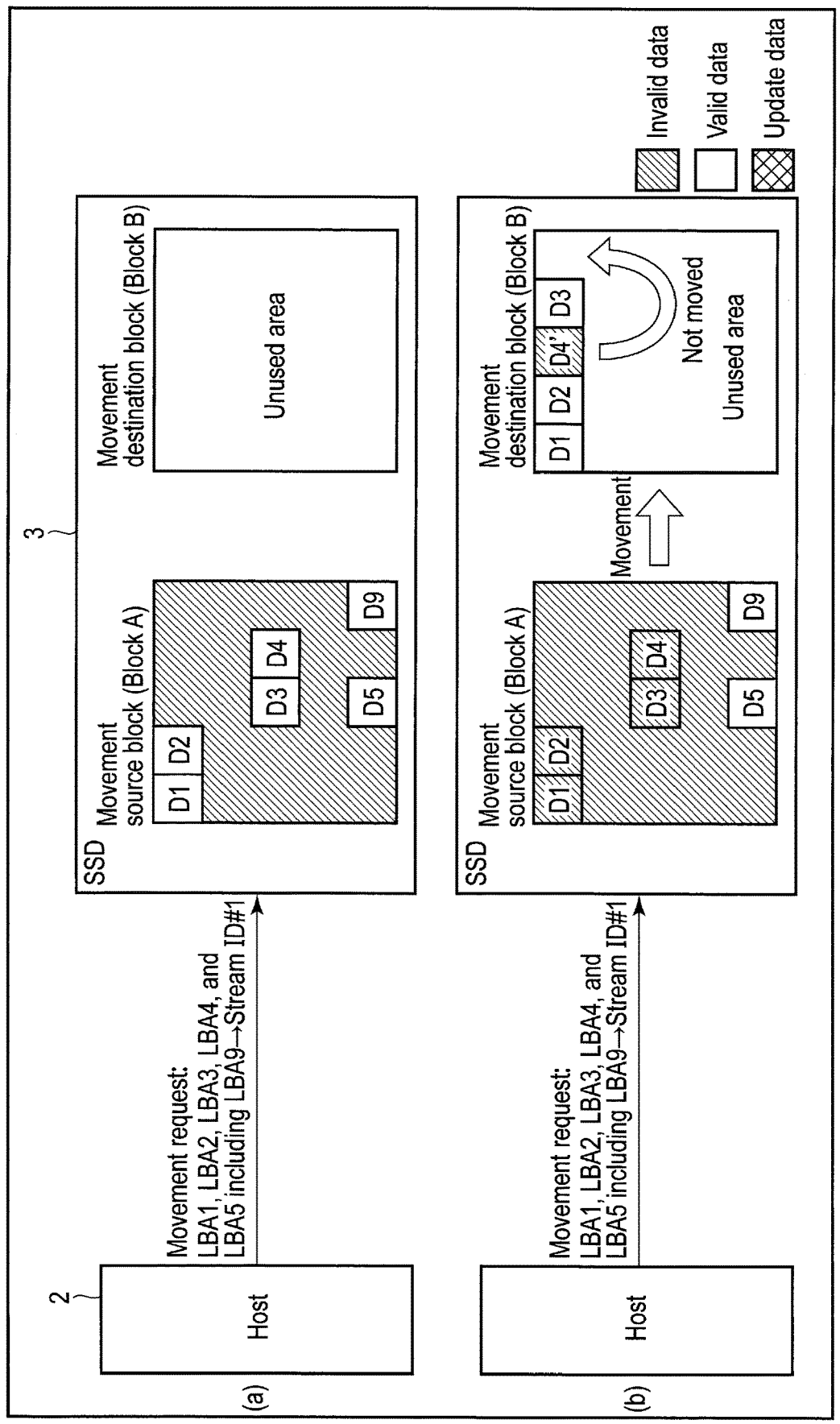
FIG. 13 is a diagram illustrating an outline of a movement process executed in response to reception of a movement request including a logical address for designating a movement source block.

FIG. 13 is a diagram illustrating an outline of a movement process executed in response to reception of a movement request including a logical address for designating a movement source block.

The movement request from the host 2 includes an LBA list, a stream ID, a logical address for designating a movement source block, and the like, in addition to a command code of the movement request. In (a) of FIG. 13, a case where the movement request from the host 2 includes an LBA list indicating LBA1 to LBA5 as logical addresses corresponding to the movement target data, a stream ID #1, and LBA9 as a logical address for designating a movement source block, and the like, in addition to the command code of the movement request, is illustrated. Since a block in which data corresponding to LBA9 is stored is a block A, the block A is designated as the movement source block. When a block associated with a stream corresponding to the stream ID #1 is a block B, this block B becomes a movement destination block.

When the controller 4 starts the movement process in response to the movement request from the host 2, the controller 4 selects data corresponding to one of the logical addresses designated by the LBA list included in the received movement request as the movement target data, and acquires a physical address (e.g., a second physical address) associated with the logical address corresponding to the movement target data with reference to an L2P table 31 stored in a DRAM 6. In addition, the controller 4 acquires a physical address (e.g., a first physical address) associated with the logical address for designating the movement source block included in the received movement request with reference to the L2P table 31 stored in the DRAM 6. The controller 4 determines whether or not the movement target data has been updated during the first period described above based on whether or not the acquired first physical address and second physical address coincide with each other.

In (b) of FIG. 13, a movement process in a case where data D4' corresponding to LBA4, updated during the first period by the process corresponding to the write request shown in (b) of FIG. 6 described above is the movement target data is illustrated.

In this case, the controller 4 acquires an identifier of the block B as the second physical address associated with LBA4 corresponding to the movement target data D4' with reference to the L2P table 31 in the DRAM 6. In addition, the controller 4 acquires an identifier of the block A as the first physical address associated with LBA9 for designating the movement source block with reference to the L2P table 31 in the DRAM 6. The controller 4 determines that the data corresponding to LBA4 has been updated during the first period based on the fact that the identifier of the block B acquired as the second physical address and the identifier of the block A acquired as the first physical address do not coincide with each other, and omits the movement of the movement target data to the movement destination block (i.e., the block B). For this reason, as shown in (b) of FIG. 13, the data D4' corresponding to LBA4 is not moved to another physical storage location in the movement destination block (i.e., the block B).

FIG. 14 is a flowchart illustrating a procedure of a movement process executed in the memory system according to the second embodiment.

First, the controller 4 of the SSD 3 receives the movement request (step S11). A case where the LBA list for designating the logical addresses of the movement target data, the movement destination block ID indicating the block to which the movement target data are to be moved, the movement source block ID indicating the block in which the movement target data are stored, and the like, are included, in addition to the command code, in the movement request is hereinafter assumed. In the movement request, logical addresses corresponding to data stored in the movement source block may be included, instead of the movement source block ID. In the movement request, a stream ID may be included, instead of the movement destination block ID.

Then, the controller 4 selects data corresponding to one of the logical addresses designated by the LBA list included in the received movement request as the movement target data, and starts movement of the data (step S12).

The controller 4 acquires the physical address associated with the logical address corresponding to the movement target data with reference to the L2P table 31 stored in the DRAM 6 (step S13), and determines whether or not the identifier (for example, the block address) of the block indicated by a part of the acquired physical address associated with the logical address corresponding to the movement target data and the identifier (for example, the block address) of the movement source block indicated by the movement source block ID included in the received movement request coincide with each other (step S14).

In a process of step S14, when it is determined that the identifier of the block indicated by a part of the acquired physical address and the identifier (i.e., the physical address) of the movement source block do not coincide with each other (No in step S14), the controller 4 omits the movement of the movement target data to the movement destination block, and executes a process of step S16 as described later.

On the other hand, in the process of step S14, when it is determined that the identifier of the block indicated by a part of the acquired physical address and the identifier of the movement source block coincide with each other (Yes in step S14), the controller 4 moves the movement target data to the movement destination block indicated by the movement destination block ID included in the received movement request, and updates the L2P table 31 such that the physical address associated with the logical address corresponding to the movement target data is changed from the physical address of the movement source block to the physical address of the movement destination block (step S15).

Then, the controller 4 determines whether or not data corresponding to all the logical addresses designated by the LBA list included in the received movement request have been selected as the movement target data (step S16), and determines that the movement of the data based on the received movement request is completed to end a series of processes when it is determined that the data corresponding to all the logical addresses designated by the received movement request have been selected as the movement target data (Yes in step S16). On the other hand, when it is determined that the data corresponding to all the logical addresses designated by the movement request have not been selected as the movement target data (No in step S16), the controller 4 performs the process in step S12 described above again, selects data corresponding to a logical address that has not yet been selected as the movement target data as the movement target data, and executes a similar process.

In the second embodiment, information that can designate the movement source block of the movement target data is included in the movement request from the host 2, and the controller 4 can thus omit a process of storing the logical addresses designated by the LBA list included in the received movement request and the physical addresses associated with the logical addresses in the correspondence table T1. Thus, it is possible to reduce a process load applied to the controller 4, and it is possible to expect a reduction in time required for the movement process. In addition, it is possible to reduce a memory required for realizing the movement process as the correspondence table T1 becomes unnecessary.

Third Embodiment

Next, a third embodiment will be described.

Note that a configuration of an information processing system 1 including a memory system according to a third embodiment is similar to that of the first embodiment.

In the first embodiment, the controller 4 of the SSD 3 receives the movement request including the LBA list and the movement destination block ID from the host 2.

On the other hand, the third embodiment is different from the first embodiment in that a controller 4 of an SSD 3 receives a movement request that further designates a granularity indicating a unit for moving data in addition to an LBA list and a movement destination block ID from a host 2. Note that the granularity designated by the movement request is represented by the number N (N>1) of consecutive logical addresses constituting the unit for moving data.

FIG. 15 is a diagram illustrating an outline of a movement process executed in a memory system according to a third embodiment, in response to reception of a movement request from a host 2.

The movement request from the host 2 includes the LBA list, the movement destination block ID, the granularity, and the like, in addition to a command code of the movement request. In FIG. 15, a case where the movement request from the host 2 includes an LBA list indicating LBA1, LBA2, LBA3, LBA4, and LBA5 as logical addresses corresponding to the movement target data, a movement destination block ID indicating a block B as a block to which the movement target data are to be moved, a granularity indicating that the number of logical addresses constituting a unit for moving data is two, and the like, in addition to the command code of the movement request, is illustrated.

First, the controller 4 recognizes that data corresponding to logical addresses designated by the LBA list are movement target data with reference to the LBA list and the granularity included in the received movement request, and recognizes a movement destination block of the movement target data with reference to the movement destination block ID included in the movement request. The controller 4 starts a movement process of sequentially moving the movement target data to an unused area in the movement destination block.

In a case of FIG. 15, the controller 4 recognizes that the unit for moving data is two data corresponding to two consecutive logical addresses with reference to the granularity included in the received movement request.

The controller 4 recognizes each of data D1 corresponding to LBA1 designated by the LBA list and data D2 corresponding to LBA2 designated by the LBA list as the movement target data with reference to the LBA list included in the received movement request, and recognizes the data D1 and the data D2 each corresponding to two consecutive LBA1 and LBA2 belonging to the same unit according to the granularity included in the movement request as the movement target data. Similarly, the controller 4 recognizes each of data D3 corresponding to LBA3 designated by the LBA list and data D4 corresponding to LBA4 designated by the LBA list as the movement target data with reference to the LBA list included in the received movement request, and recognizes the data D3 and the data D4 each corresponding to two consecutive LBA3 and LBA4 belonging to the same unit according to the granularity included in the movement request as the movement target data. Further, the controller 4 recognizes data D5 corresponding to LBA5 designated by the LBA list as the movement target data with reference to the LBA list included in the received movement request, and recognizes the data D5 and data D6 each corresponding to two consecutive LBA5 and LBA6 belonging to the same unit according to the granularity included in the movement request as the movement target data. That is, LBA6 is not designated by the LBA list, but LBA6 is a logical address belonging to the same unit as a unit to which LBA5 belongs, and the controller 4 recognizes not only the data D5 corresponding to LBA5 designated by the LBA list but also the data D6 that is not designated by the LBA list as the movement target data.

In this case, even though the data D6 corresponding to LBA6 is stored in a block different from a block in which the data D5 corresponding to LBA5 is stored, the controller 4 recognizes the data D6 corresponding to LBA6 as the movement target data.

In addition, in a case of FIG. 15, the controller 4 recognizes that a movement destination block of the movement target data D1 to the movement target data D6 is the block B with reference to the movement destination block ID included in the received movement request.

The controller 4 moves the movement target data D1 to the movement target data D6 corresponding to LBA1 to LBA6 to an unused area in the movement destination block B, and handles the movement target data D1 to the movement target data D6 as valid data in the block B and handles the previous data included in the movement source block as invalid data. In other words, the controller 4 updates the L2P table 31 such that the physical addresses associated with the movement target data D1 to the movement target data D6 are changed from physical addresses of the movement source block to physical addresses of the movement destination block B.

Figure 16:
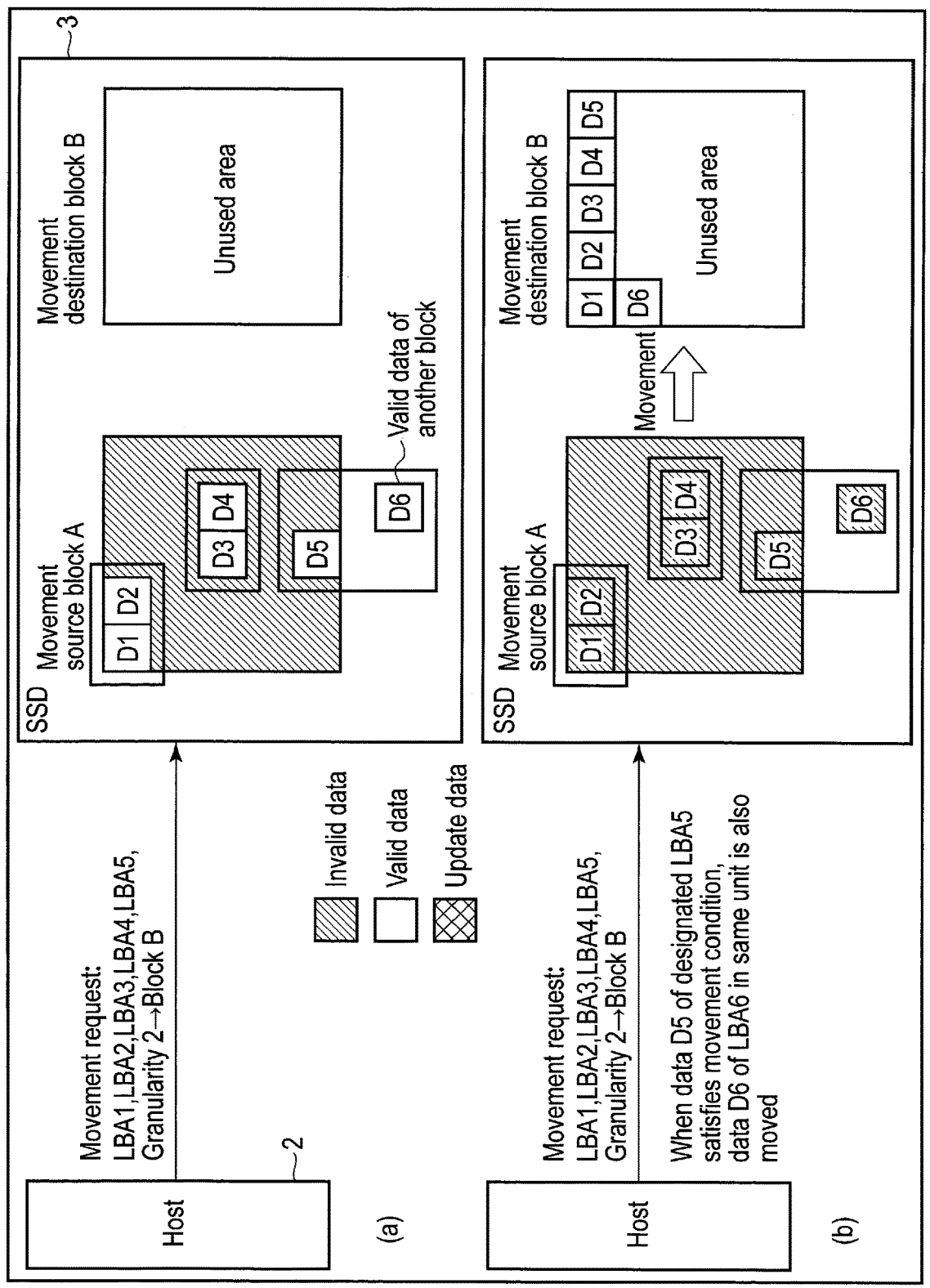
FIG. 16 is a diagram illustrating an operation that does not omit movement of movement target data in the memory system according to the third embodiment.

FIG. 16 is a diagram illustrating an operation that does not omit movement of movement target data in the memory system according to the third embodiment. Note that whether or not the movement target data has been updated during the first period described above it is determined by any one of the methods described in the first and second embodiments described above, and a detailed description thereof is omitted here.

The movement request from the host 2 includes the LBA list, the movement destination block ID, the granularity, and the like, in addition to a command code of the movement request. In (a) of FIG. 16, a case where the movement request from the host 2 includes an LBA list indicating LBA1, LBA2, LBA3, LBA4, and LBA5 as logical addresses corresponding to the movement target data, a movement destination block ID indicating a block B as a block to which the movement target data are to be moved, a granularity indicating that the number of logical addresses constituting a unit for moving data is two, and the like, in addition to the command code of the movement request, is illustrated.

When it is determined that data corresponding to the logical address designated by the LBA list included in the received movement request satisfies a movement condition, that is, when it is determined that the data corresponding to the designated logical address has not been updated during the first period described above, the controller 4 moves the data corresponding to the designated logical address and data corresponding to a logical address that belongs to the same unit as a unit to which the designated logical address belongs and is not designated by the movement request to the movement destination block. For example, if the data corresponding to LBA5 satisfies the movement condition, not only the data corresponding to LBA5 but also the data corresponding to LBA6 is moved to the movement destination block. On the other hand, if the data corresponding to LBA5 does not satisfy the movement condition, the movement of the data corresponding to LBA5 is omitted. In this case, the data corresponding to LBA6 is not moved. Note that for each LBA designated by the LBA list, whether or not to move the data corresponding to this LBA is determined according to whether or not the data corresponding to this LBA has been updated during the first period. For example, LBA2 belongs to the same unit as a unit to which LBA1 designated by the movement request belongs, but LBA2 is also designated by the movement request. Therefore, whether or not to move the data corresponding to LBA2 is determined depending on whether or not the data corresponding to LBA2 satisfies the movement condition. Similarly, LBA4 belongs to the same unit as a unit to which LBA3 designated by the movement request belongs, but LBA4 is also designated by the movement request. Therefore, whether or not to move the data corresponding to LBA4 is determined depending on whether or not the data corresponding to LBA4 satisfies the movement condition.

In (b) of FIG. 16, an operation when it is determined that none of the data corresponding to LBA1, LBA2, LBA3, LBA4, and LBA5 have been updated during the first period described above is illustrated.

LBA1, LBA2, LBA3, LBA4, and LBA5 are logical addresses designated by the LBA list. Therefore, for each of these LBA1, LBA2, LBA3, LBA4, and LBA5, it is individually determined whether or not the data corresponding to this LBA has been updated during the first period. When the data corresponding to the designated LBA has not been updated during the first period, the data corresponding to this LBA satisfies the movement condition. For this reason, the data corresponding to this LBA is moved from the movement source block to the movement destination block. On the other hand, when the data corresponding to this LBA has been updated during the first period, the data corresponding to this LBA does not satisfy the movement condition. For this reason, the movement of the data corresponding to this LBA is omitted. When all of the data corresponding to LBA1, LBA2, LBA3, LBA4, and LBA5 satisfy the movement conditions, data D1 corresponding to LBA1, data D2 corresponding to LBA2, data D3 corresponding to LBA3, data D4 corresponding to LBA4, and data D5 corresponding to LBA5 are moved to the movement destination block B, as shown in (b) of FIG. 16. LBA6 is an LBA belonging to the same unit as the unit to which LBA5 designated by the LBA list belongs. However, this LBA6 is not designated by the LBA list. For this reason, whether or not to move the data D6 corresponding to LBA6 is determined depending on whether or not the data corresponding to LBA5 designated by the movement request satisfies the movement condition. When the data D5 corresponding to LBA5 has not been updated during the first period, the data D5 corresponding to LBA5 satisfies the movement condition, and thus, the data D6 corresponding to LBA6 is also moved to the movement destination block B, as shown in (b) of FIG. 16.

Figure 17:
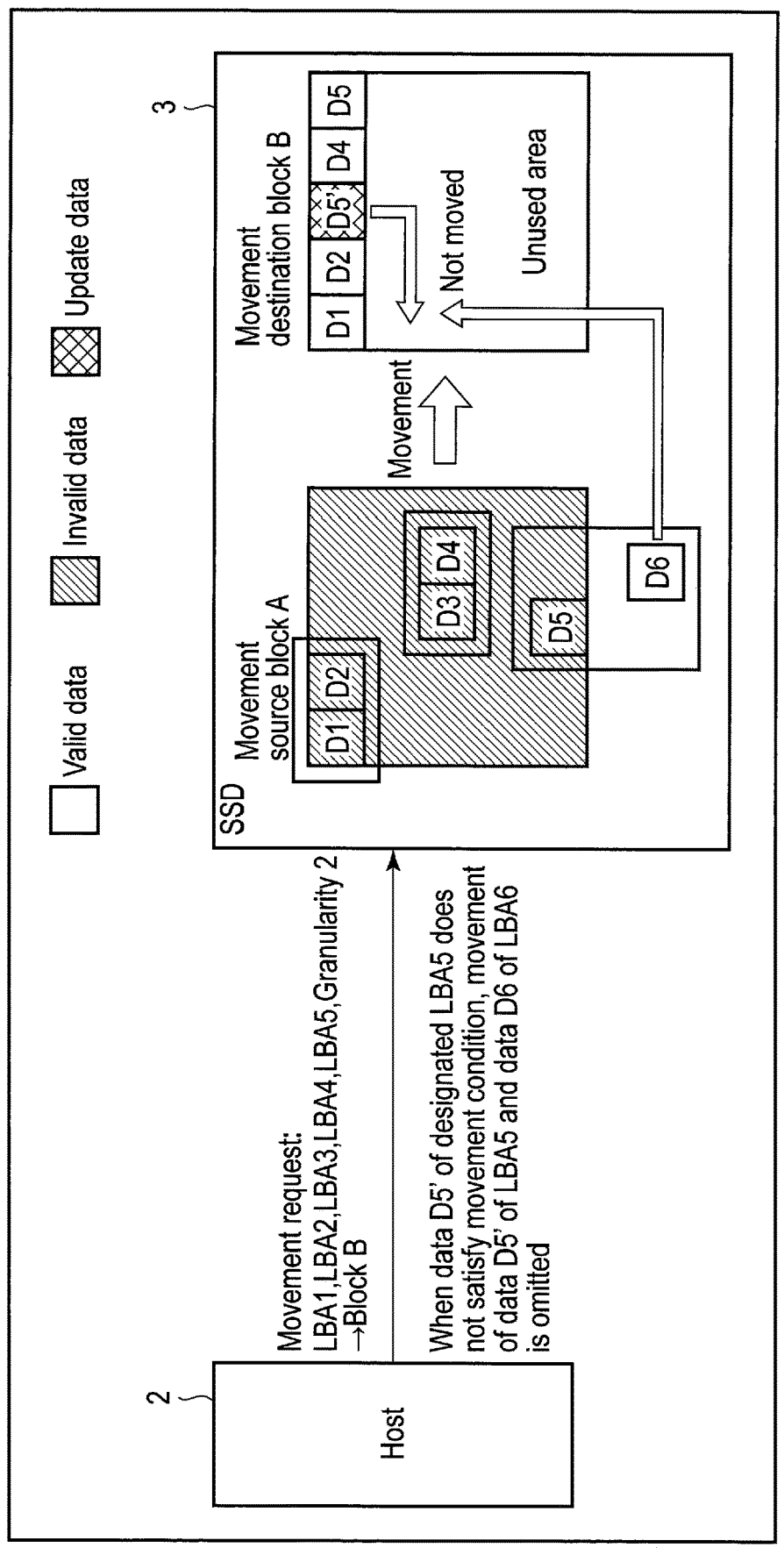
FIG. 17 is a diagram illustrating an operation of omitting the movement of the movement target data in the memory system according to the third embodiment.

FIG. 17 is a diagram illustrating an operation of omitting the movement of the movement target data in the memory system according to the third embodiment. FIG. 17 is a diagram illustrating an operation in a case where it is determined that the data corresponding to LBA5 has been updated during the first period described above is illustrated. Note that the movement request from the host 2 includes an LBA list indicating LBA1, LBA2, LBA3, LBA4, and LBA5, a movement destination block ID indicating a block B as a block to which the movement target data are to be moved, and a granularity indicating that the number of logical addresses constituting a unit for moving data is two in addition to a command code of the movement request, similar to the case of FIG. 16 described above.

In this case, when the controller 4 selects data D5' corresponding to LBA5 designated by the LBA list as the movement target data, the controller 4 determines that the data D5' does not satisfy the movement condition described above, and omits movement of the data D5' corresponding to LBA5 designated by the LBA list to the movement destination block B (in a case of FIG. 17, movement of the data D5' to another physical storage location of the movement destination block B). In addition, when the controller 4 recognizes that LBA6 belonging to the same unit as the unit to which LBA5 designated by the LBA list belongs is not designated by the LBA list, by the granularity included in the received movement request, the controller 4 also omits movement of data D6 corresponding to LBA 6 to the movement destination block B. For this reason, as shown in FIG. 17, data D1 to data D4 corresponding to LBA1 to LBA4, moved according to the received movement request and the data D5' corresponding to LBA5, updated according to the write request received during the first period are stored in the movement destination block B. Note that the data D5' may be written to a block different from the movement destination block B.

Figure 18:
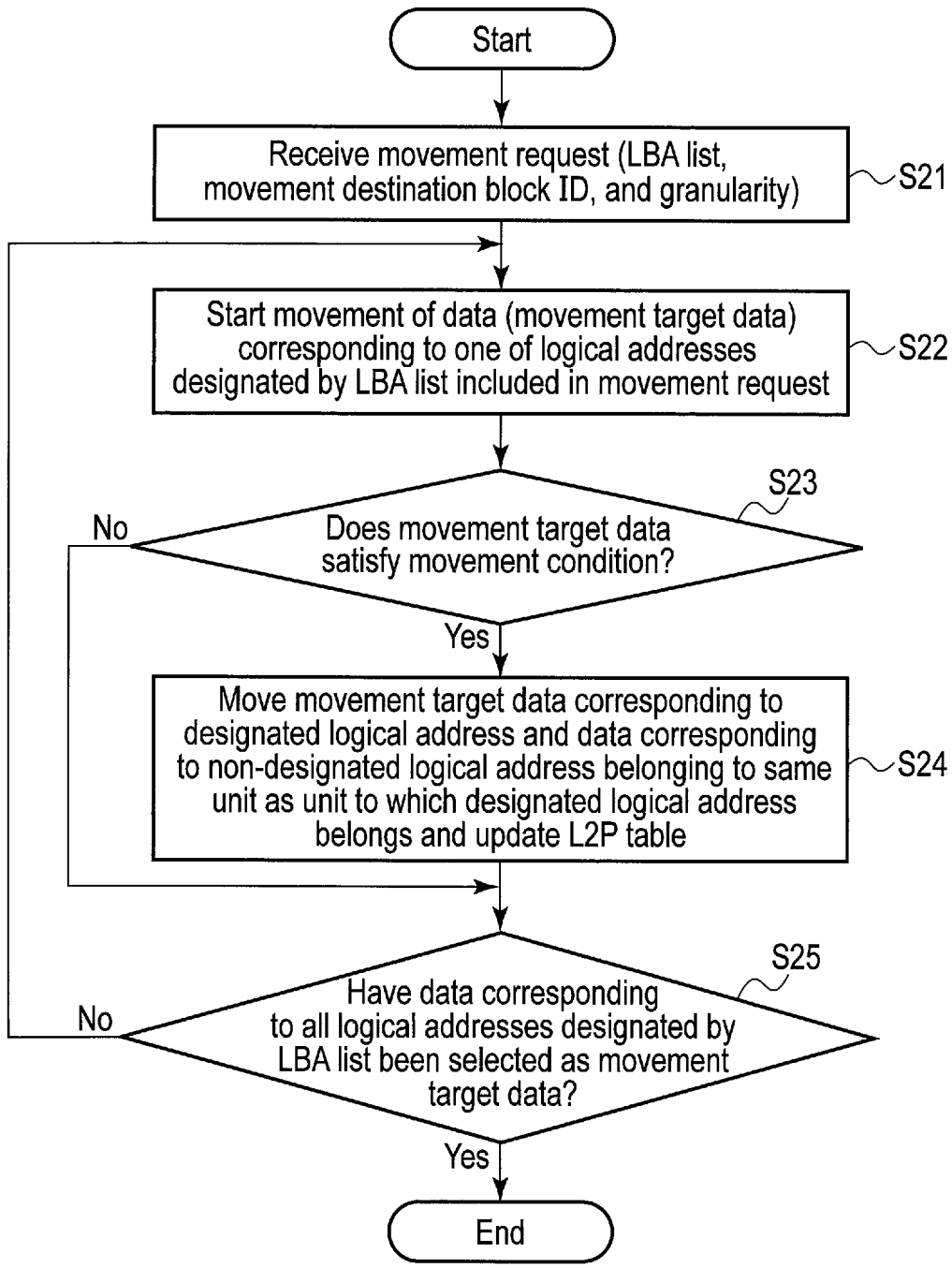
FIG. 18 is a flowchart illustrating a procedure of a movement process executed in the memory system according to the third embodiment.

FIG. 18 is a flowchart illustrating a procedure of a movement process executed in the memory system according to the third embodiment.

First, the controller 4 of the SSD 3 receives the movement request (step S21). The LBA list for designating the logical addresses of the movement target data, the movement destination block ID indicating the block to which the movement target data are to be moved, the granularity indicating the number of consecutive logical addresses constituting the unit for moving data, and the like, are included, in addition to the command code, in the movement request.

Then, the controller 4 selects data corresponding to one of the logical addresses designated by the LBA list included in the received movement request as the movement target data, and starts movement of the data (step S22).

The controller 4 determines whether or not the movement target data satisfies the movement condition described above (in other words, the controller 4 determines whether or not the movement target data has not been updated during the first period described above) (step S23).

In a process of step S23, when it is determined that the movement target data does not satisfy the movement condition described above, that is, when it is determined that the movement target data has been updated during the first period described above (No in step S23), the controller 4 omits the movement of the movement target data to the movement destination block, and executes a process of step S25 as described later.

On the other hand, in the process of step S23, when it is determined that the movement target data satisfies the movement condition described above, that is, when it is determined that the movement target data has not been updated during the first period described above (Yes in step S23), the controller 4 moves the movement target data and data corresponding to a non-designated logical address belonging to the same unit as the unit to which the logical address corresponding to the movement target data belongs to the movement destination block, and updates the L2P table 31 such that physical address associated with the logical addresses each corresponding to these data are changed from physical addresses of the movement source block to physical addresses of the movement destination block (step S24). Here, the non-designated logical address means a logical address that is not designated by the movement request. As such, in step S24, when the movement target data satisfies the movement condition, the controller 4 moves not only the movement target data but also another data corresponding to another logical address that belongs to the same unit as the unit to which the logical address of the movement target data belongs and is not designated by the movement request (that is, the other data stored in a physical address of the NAND flash memory 5 associated with the other logical address).

Then, the controller 4 determines whether or not data corresponding to all the logical addresses designated by the LBA list included in the received movement request have been selected as the movement target data (step S25), and determines that the movement of the data based on the received movement request is completed to end a series of processes when it is determined that the data corresponding to all the logical addresses designated by the movement request have been selected as the movement target data (Yes in step S25). On the other hand, when it is determined that the data corresponding to all the logical addresses designated by the movement request have not been selected as the movement target data (No in step S25), the controller 4 performs the process in step S22 described above again, selects data corresponding to a logical address that has not yet been selected as the movement target data as the movement target data, and executes a similar process.

In the third embodiment, the host 2 can designate the granularity indicating the number of consecutive logical addresses constituting the unit for moving data, and can designate data corresponding to a plurality of logical addresses (N logical addresses) equal to the granularity as the movement target data by designating one logical address by the LBA list. Thus, the host 2 can reduce the number of managed logical addresses to 1/N as compared with a case where the granularity cannot be designated. In addition, by designating the granularity by the host 2, the controller 4 can collect and move data having a high relevance, and can store the data having the high relevance in close physical storage locations. Further, when the data corresponding to the logical address designated by the movement request received from the host 2 has been updated during the first period, not only the movement of the data corresponding to the designated logical address but also the movement of the data corresponding to the non-designated logical address belonging to the same unit as the unit to which the designated logical address belongs are omitted. Therefore, even though the granularity is designated by the movement request as such, the controller 4 can omit unnecessary data movement.

According to each embodiment described above, the movement request designating the logical address of the movement target data is received from the host 2. When the update data corresponding to the designated logical address is not written to the NAND flash memory 5 by the write request from the host 2 in a period from the reception of the movement request to the start of the movement of the data corresponding to the designated logical address, the movement process of moving the data stored in the physical address associated with the designated logical address to the movement destination block in the NAND flash memory 5 is executed. On the other hand, when this update data is written to the NAND flash memory 5 in this period, the movement process is not executed. Therefore, the movement process based on an instruction of the host 2 can be realized while the unnecessary data movement causing an increase in the WAF is suppressed. Accordingly, it is possible to efficiently control a data placement in the NAND flash memory 5.

Note that in the present embodiment, the NAND flash memory is illustrated as the nonvolatile memory. However, functions of the present embodiment can be applied to various other types of nonvolatile memories such as, for example, a magnetoresistive random access memory (MRAM), a phase change random access memory (PRAM), a resistive random access memory (ReRAM), and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile memory including a plurality of blocks; and
a controller electrically connected to the nonvolatile memory and configured to control the nonvolatile memory,
wherein the controller is configured to:
receive a movement request from the host, the movement request designating a logical address of movement target data;
when update data corresponding to the designated logical address is not written to the nonvolatile memory by a write request from the host in a period from the reception of the movement request to start of movement of data corresponding to the designated logical address, execute a movement process of moving data stored in a physical address of the nonvolatile memory associated with the designated logical address to a movement destination block in the nonvolatile memory, the physical address being obtained by referring to a logical-to-physical address conversion table; and
when the update data is written to the nonvolatile memory in the period, not execute the movement process.

2. The memory system according to claim 1, wherein
the movement request designates an identifier of a block or an identifier of a stream, and
the controller is configured to determine a block specified by the designated identifier of the block or a block allocated to a steam specified by the designated identifier of the stream as the movement destination block.

3. The memory system according to claim 1, wherein
the controller is configured to:
acquire a physical address of the nonvolatile memory associated with the designated logical address by referring to the logical-to-physical address conversion table and store the designated logical address and the acquired physical address in a first table, in response to the reception of the movement request; and acquire a physical address associated with the designated logical address by referring to the logical-to-physical address conversion table at the time of starting the movement of the data corresponding to the designated logical address and determine whether or not the update data has been written to the nonvolatile memory in the period based on whether or not the acquired physical address coincides with the physical address of the first table.

4. The memory system according to claim 3, wherein the physical address stored in the first table is an identifier of a block in which the data corresponding to the designated logical address is stored, and the controller is configured to determine whether or not the update data has been written to the nonvolatile memory in the period based on whether an identifier of a block indicated by a part of the acquired physical address coincides with the identifier of the block stored in the first table.

5. The memory system according to claim 1, wherein the controller is configured to:

store the designated logical address in a first table in response to the reception of the movement request;

store first information indicating that the update data has been written in the first table when the update data has been written in the period; and determine whether or not the update data has been written to the nonvolatile memory in the period based on whether the first information is stored in the first table with reference to the first table at the time of starting the movement of the data corresponding to the designated logical address.

6. The memory system according to claim 1, wherein the movement request includes an identifier of a movement source block in which the data corresponding to the designated logical address is stored, and the controller is configured to:

acquire a physical address associated with the designated logical address by referring to the logical-to-physical address conversion table at the time of starting the movement of the data corresponding to the designated logical address; and determine whether or not the update data has been written to the nonvolatile memory in the period based on whether or not an identifier of a block indicated by a part of the acquired physical address coincides with the identifier of the movement source block.

7. The memory system according to claim 1, wherein the movement request includes a first logical address corresponding to first data stored in a movement source block in which the data corresponding to the designated logical address is stored, and the controller is configured to:

acquire a first physical address associated with the first logical address and a second physical address associated with the designated logical address by referring to the logical-to-physical address conversion table at the time of starting the movement of the data corresponding to the designated logical address; and determine whether or not the update data has been written to the nonvolatile memory in the period based on whether an identifier of a block indicated by a part of the acquired second physical address coincides with an identifier of the movement source block indicated by a part of the acquired first physical address.

8. The memory system according to claim 7, wherein the first data is management data indicating a list of a plurality of logical addresses each corresponding to a plurality of data portions written to the movement source block.

9. The memory system according to claim 1, wherein the movement request designates a granularity indicating a unit for moving data, and the granularity is represented by the number of consecutive logical addresses constituting the unit, and the controller is configured to:

when the update data corresponding to the designated logical address is not written to the nonvolatile memory by the write request from the host in the period, execute a movement process of moving the data stored in the physical address of the nonvolatile memory associated with the designated logical address and another data stored in a physical address of the nonvolatile memory associated with another logical address that belongs to a same unit as a unit to which the designated logical address belongs and is not designated by the movement request to the movement destination block in the nonvolatile memory; and when the update data has been written to the nonvolatile memory in the period, not execute the movement process of moving the data and the other data.

10. A method of controlling a nonvolatile memory including a plurality of blocks, the method comprising:

receiving a movement request from a host, the movement request designating a logical address of movement target data;

when update data corresponding to the designated logical address is not written to the nonvolatile memory by a write request from the host in a period from the reception of the movement request to start of movement of data corresponding to the designated logical address, executing a movement process of moving data stored in a physical address of the nonvolatile memory associated with the designated logical address to a movement destination block in the nonvolatile memory, the physical address being obtained by referring to a logical-to-physical address conversion table; and when the update data is written to the nonvolatile memory in the period, not executing the movement process.

11. The method according to claim 10, wherein the movement request designates an identifier of a block or an identifier of a stream, and the control method further comprising determining a block specified by the designated identifier of the block or a block allocated to a steam specified by the designated identifier of the stream as the movement destination block.

12. The method according to claim 10, further comprising:

executing an operation of acquiring a physical address of the nonvolatile memory associated with the designated logical address by referring to the logical-to-physical address conversion table and an operation of storing the designated logical address and the acquired physical address in a first table, in response to the reception of the movement request; and executing an operation of acquiring a physical address associated with the designated logical address by referring to the logical-to-physical address conversion table at the time of starting the movement of the data corresponding to the designated logical address and an operation of determining whether or not the update data has been written to the nonvolatile memory in the period based on whether or not the acquired physical address coincides with the physical address of the first table.

13. The method according to claim 10, wherein the movement request includes an identifier of a movement source block in which the data corresponding to the designated logical address is stored, and the control method further comprising executing an operation of acquiring a physical address associated with the designated logical address by referring to the logical-to-physical address conversion table at the time of starting the movement of the data corresponding to the designated logical address and an operation of determining whether or not the update data has been written to the nonvolatile memory in the period based on whether or not an identifier of a block indicated by a part of the acquired physical address coincides with the identifier of the movement source block.

14. The method according to claim 10, wherein the movement request designates a granularity indicating a unit for moving data, and the granularity is represented by the number of consecutive logical addresses constituting the unit, and the control method further comprising:

when the update data corresponding to the designated logical address has not been written to the nonvolatile memory by the write request from the host in the period, executing a movement process of moving the data stored in the physical address of the nonvolatile memory associated with the designated logical address and another data stored in a physical address of the nonvolatile memory associated with another logical address that belongs to a same unit as a unit to which the designated logical address belongs and is not designated by the movement request to the movement destination block in the nonvolatile memory; and when the update data has been written to the nonvolatile memory in the period, not executing the movement process of moving the data and the other data.

* * * * *